US011118499B2

(12) United States Patent
Imamura et al.

(10) Patent No.: US 11,118,499 B2
(45) Date of Patent: *Sep. 14, 2021

(54) COMBUSTION CHAMBER STRUCTURE FOR ENGINES

(71) Applicant: MAZDA MOTOR CORPORATION, Hiroshima (JP)

(72) Inventors: Satoshi Imamura, Hiroshima (JP); Masaki Fukuma, Hiroshima (JP); Yasushi Nakahara, Higashihiroshima (JP); Atsushi Inoue, Aki-gun (JP); Kota Matsumoto, Aki-gun (JP); Yoshiharu Ueki, Hatsukaichi (JP); Michiharu Kawano, Hiroshima (JP); Yuya Honda, Hiroshima (JP); Kento Onishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/618,041

(22) PCT Filed: May 22, 2018

(86) PCT No.: PCT/JP2018/019593
§ 371 (c)(1),
(2) Date: Nov. 27, 2019

(87) PCT Pub. No.: WO2018/221306
PCT Pub. Date: Dec. 6, 2018

(65) Prior Publication Data
US 2020/0141306 A1    May 7, 2020

(30) Foreign Application Priority Data

Jun. 2, 2017 (JP) .............................. JP2017-109599
Aug. 25, 2017 (JP) .................................. 2017-162679
Oct. 24, 2017 (JP) .............................. JP2017-205154

(51) Int. Cl.
*F02B 23/10* (2006.01)
*F02F 3/26* (2006.01)

(52) U.S. Cl.
CPC .............. *F02B 23/101* (2013.01); *F02F 3/26* (2013.01)

(58) Field of Classification Search
CPC .......... F02F 3/24; F02F 3/26; F02F 2001/241; F02F 1/242; F02B 23/101; F02B 2023/102; F02B 2023/106
See application file for complete search history.

(56) References Cited

U.S. PATENT DOCUMENTS 4,709,672 A * 12/1987 Ishida ..................... F02B 23/04
                                                      123/256
4,920,937 A    5/1990 Sasaki et al.
(Continued)

FOREIGN PATENT DOCUMENTS

CN        106014667 A    10/2016
EP          0558072 A1     9/1993
(Continued)

OTHER PUBLICATIONS

An Office Action issued by the United States Patent and Trademark Office dated Nov. 5, 2020, which corresponds to U.S. Appl. No. 16/618,321 and is related to U.S. Appl. No. 16/618,041.
(Continued)

*Primary Examiner* — Sizo B Vilakazi
*Assistant Examiner* — Anthony L Bacon
(74) *Attorney, Agent, or Firm* — Studebaker & Brackett PC

(57) ABSTRACT

A structure of a combustion chamber for an engine includes a crown surface of a piston, a combustion chamber ceiling
(Continued)

surface formed on a cylinder head, an injector and an ignition plug provided on the combustion chamber ceiling surface, and an intake opening and an exhaust opening opened in the combustion chamber ceiling surface. A side where the intake opening is opened is defined as an intake port side, and a side where the exhaust opening is opened is defined as an exhaust port side, with respect to a position, as a reference, where an ignition portion of the ignition plug is disposed in a plan view from one side in a cylinder axis direction, the injector is configured to inject fuel toward the exhaust port side, and a reverse squish flow generation portion, which draws an air-fuel mixture toward the intake port side, is provided in the combustion chamber.

15 Claims, 34 Drawing Sheets

(56) References Cited

U.S. PATENT DOCUMENTS

| | | | |
|---|---|---|---|
| 5,115,774 | A | 5/1992 | Nomura et al. |
| 5,215,053 | A * | 6/1993 | Ito ................... F02D 41/1401 |
| | | | 123/276 |
| 5,271,362 | A | 12/1993 | Kobayashi et al. |
| 5,305,720 | A | 4/1994 | Ando et al. |
| 5,711,269 | A * | 1/1998 | Oda ................... F02B 31/085 |
| | | | 123/262 |
| 5,727,520 | A | 3/1998 | Wirth et al. |
| 5,813,385 | A | 9/1998 | Yamauchi et al. |
| 5,927,244 | A | 7/1999 | Yamauchi et al. |
| 5,960,767 | A * | 10/1999 | Akimoto ................ F02F 3/26 |
| | | | 123/298 |
| RE36,500 | E | 1/2000 | Ando et al. |
| 6,009,849 | A * | 1/2000 | Yamamoto ........... F02B 23/105 |
| | | | 123/298 |
| 6,035,824 | A * | 3/2000 | Lee ..................... F02F 1/242 |
| | | | 123/295 |
| 6,125,103 | A * | 9/2000 | Bauml ............... H04L 27/2602 |
| | | | 370/203 |
| 6,378,490 | B1 * | 4/2002 | Ottowitz ............. F02F 1/4214 |
| | | | 123/305 |
| 6,460,509 | B1 | 10/2002 | Muramatsu et al. |
| 6,725,828 | B1 | 4/2004 | Han et al. |
| 10,570,808 | B2 | 2/2020 | Fukuda et al. |
| 2002/0073956 | A1 * | 6/2002 | Suzuki ................. F02B 23/101 |
| | | | 123/298 |
| 2005/0109328 | A1 * | 5/2005 | Sakai ..................... F02B 23/08 |
| | | | 123/661 |
| 2008/0276900 | A1 * | 11/2008 | Umierski ............. F02B 23/101 |
| | | | 123/193.6 |
| 2010/0000493 | A1 | 1/2010 | Nishimoto et al. |
| 2010/0006061 | A1 | 1/2010 | Shibata et al. |
| 2010/0175660 | A1 | 7/2010 | Nishimoto et al. |
| 2012/0234285 | A1 | 9/2012 | Venugopal et al. |
| 2013/0092116 | A1 | 4/2013 | Teshima et al. |
| 2015/0007802 | A1 * | 1/2015 | Imafuku ................. F02F 1/22 |
| | | | 123/74 R |
| 2015/0308371 | A1 | 10/2015 | Eismark |
| 2016/0138461 | A1 * | 5/2016 | Ono .................... F02B 23/0693 |
| | | | 123/294 |
| 2016/0186687 | A1 | 6/2016 | Minooka |
| 2016/0201551 | A1 | 7/2016 | Uchida et al. |
| 2016/0265417 | A1 * | 9/2016 | Ono .................... F02B 23/0645 |
| 2016/0281663 | A1 | 9/2016 | Sasaki et al. |
| 2016/0319729 | A1 | 11/2016 | Sakai |
| 2017/0009698 | A1 | 1/2017 | Tsugawa et al. |
| 2017/0082058 | A1 | 3/2017 | Katakura et al. |
| 2018/0340488 | A1 | 11/2018 | Fukuda et al. |
| 2020/0141306 | A1 | 5/2020 | Imamura et al. |
| 2020/0166003 | A1 * | 5/2020 | Imamura ............. F02D 41/3818 |
| 2020/0232380 | A1 | 7/2020 | Kim et al. |

FOREIGN PATENT DOCUMENTS

| | | |
|---|---|---|
| EP | 1 069 291 A2 | 1/2001 |
| EP | 1533491 A1 | 5/2005 |
| JP | H04-107485 U | 9/1992 |
| JP | H09-280055 A | 10/1997 |
| JP | H10-115223 A | 5/1998 |
| JP | H10-131756 A | 5/1998 |
| JP | H10-131757 A | 5/1998 |
| JP | H10-131758 A | 5/1998 |
| JP | H11-107759 A | 4/1999 |
| JP | H11-182248 A | 7/1999 |
| JP | 2001-159315 A | 6/2001 |
| JP | 2003-214167 A | 7/2003 |
| JP | 2003-322021 A | 11/2003 |
| JP | 2004-232583 A | 8/2004 |
| JP | 2004-324532 A | 11/2004 |
| JP | 2006-322334 A | 11/2006 |
| JP | 2015-001166 A | 1/2015 |
| JP | 2016-094925 A | 5/2016 |
| WO | 2014/096956 A1 | 6/2014 |
| WO | 2015/097514 A1 | 7/2015 |

OTHER PUBLICATIONS

International Search Report issued in PCT/JP2018/019593; dated Aug. 28, 2018.
Japanese Office action dated Jan. 29, 2019 for JP Application No. 2017-205150 which is related to JP Application No. 2017-205154.
Japanese Office action dated Jan. 29, 2019 for JP Application No. 2017-205151, which is related to JP Application No. 2017-205154.
Japanese Office action dated Jan. 29, 2019 for JP Application No. 2017-205154.
Japanese Office action dated Jul. 2, 2019 for JP Application No. 2017-205151, which is related to JP Application No. 2017-205154.
Communication pursuant to Article 94(3) EPC issued by the European Patent Office dated Sep. 25, 2020, which corresponds to European Patent Application No. 18 809 373.6-1004 and is related to U.S. Appl. No. 16/618,041.
The extended European search report issued by the European Patent Office dated Jan. 14, 2020, which corresponds to European Patent Application No. 18809373.6-1004 and is related to U.S. Appl. No. 16/618,041.
The extended European search report issued by the European Patent Office dated Jan. 14, 2020, which corresponds to European Patent Application No. 18808949.4-1004 and is related to U.S. Appl. No. 16/618,041.
The extended European search report issued by the European Patent Office dated Jun. 9, 2020, which corresponds to European Patent Application No. 18809644.0-1004 and is related to U.S. Appl. No. 16/618,041.
The extended European search report issued by the European Patent Office dated Feb. 5, 2020, which corresponds to European Patent Application No. 18809101.1-1004 and is related to U.S. Appl. No. 16/618,041.
Communication pursuant to Article 94(3) EPC issued by the European Patent Office dated Dec. 7, 2020, which corresponds to European Patent Application No. 18 809 101.1-1004 and is related to U.S. Appl. No. 16/618,041.
An Office Action issued by the United States Patent and Trademark Office dated Dec. 10, 2020, which corresponds to U.S. Appl. No. 16/618,325 and is related to U.S. Appl. No. 16/618,041.
An Office Action mailed by China National Intellectual Property Administration dated Jan. 4, 2021, which corresponds to Chinese Patent Application No. 201880035100.4 and is related to U.S. Appl. No. 16/618,041 with English language summary.

* cited by examiner

FIG.3
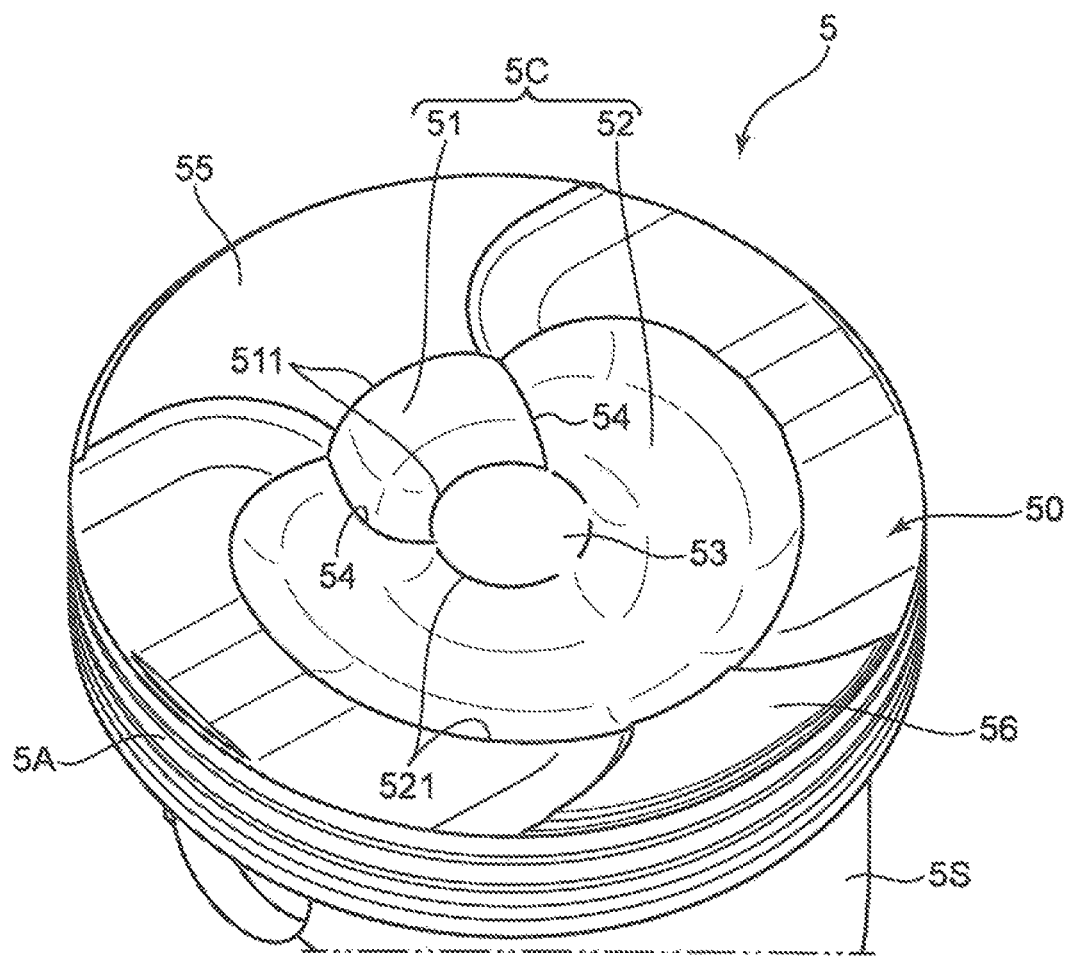
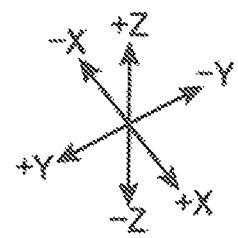

FIG.10A
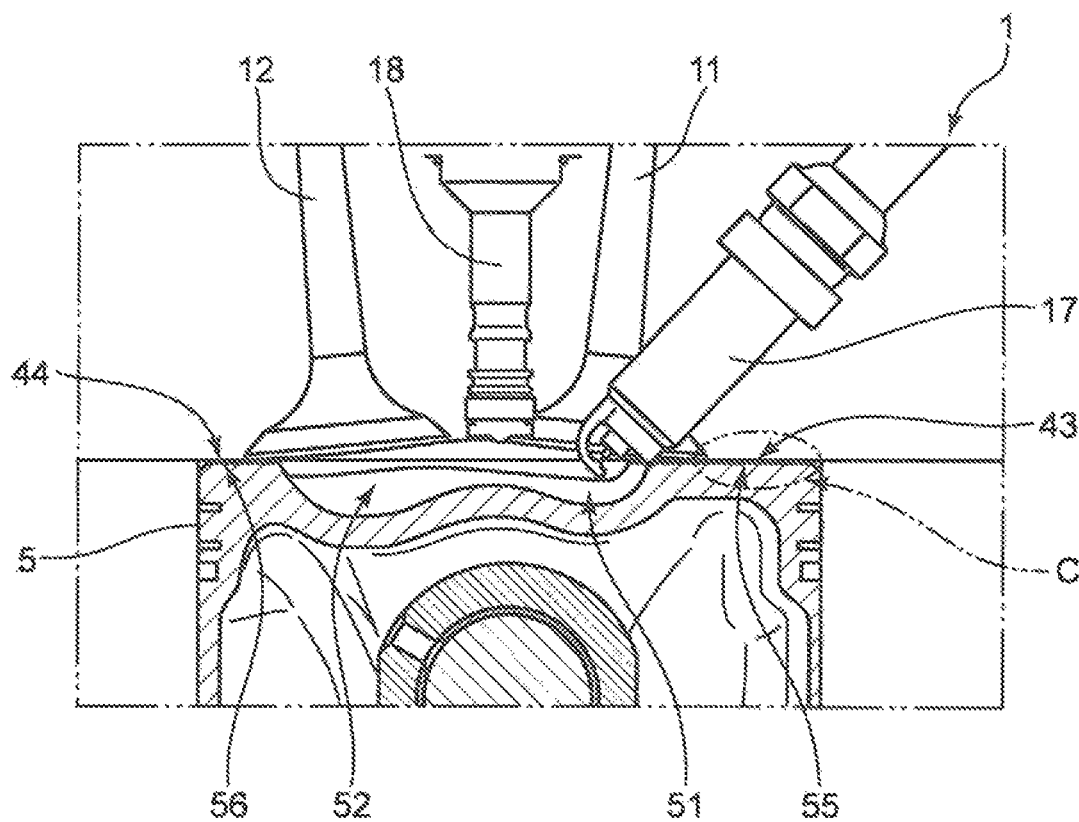
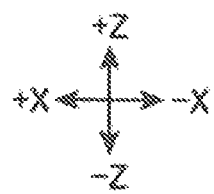

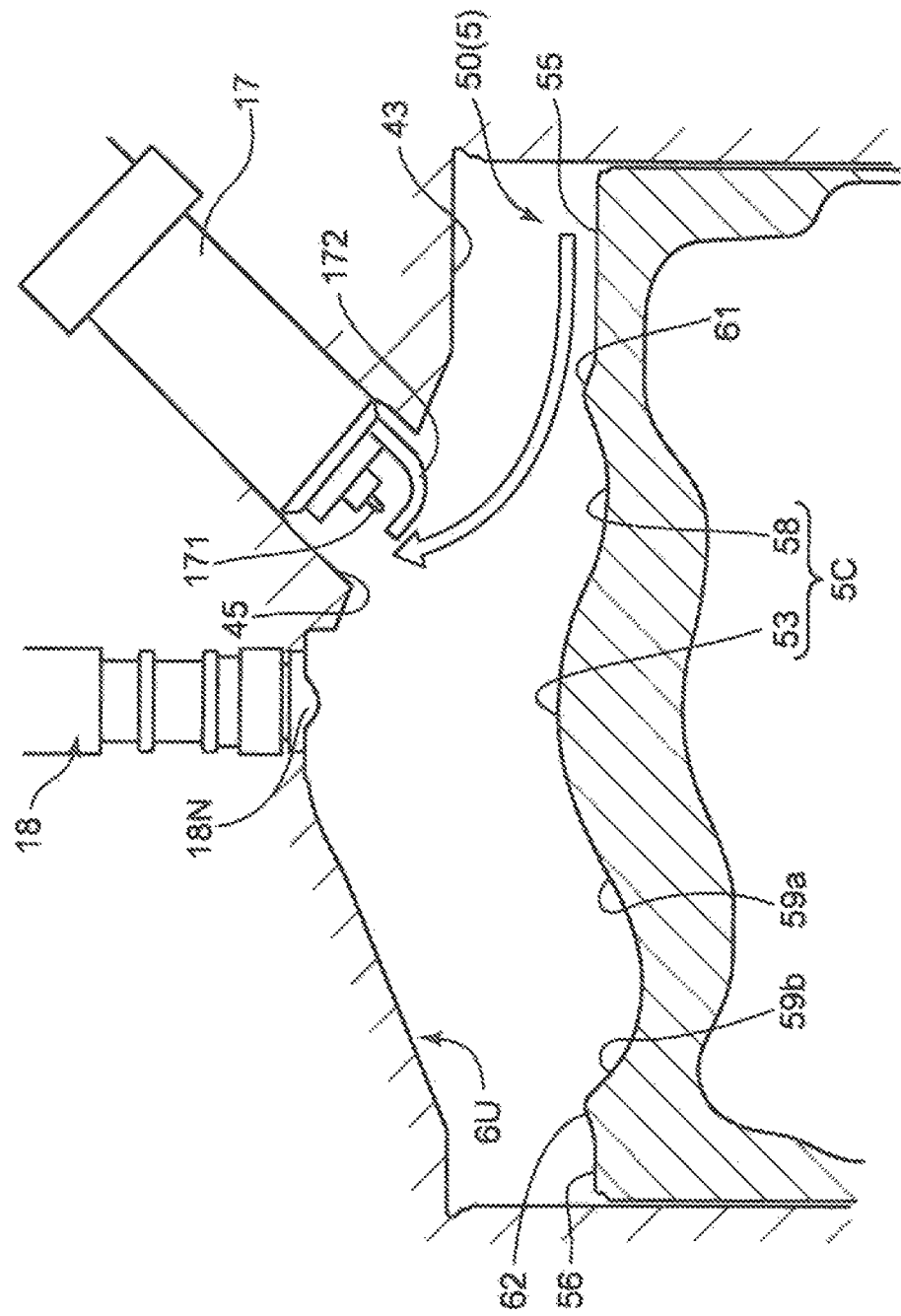

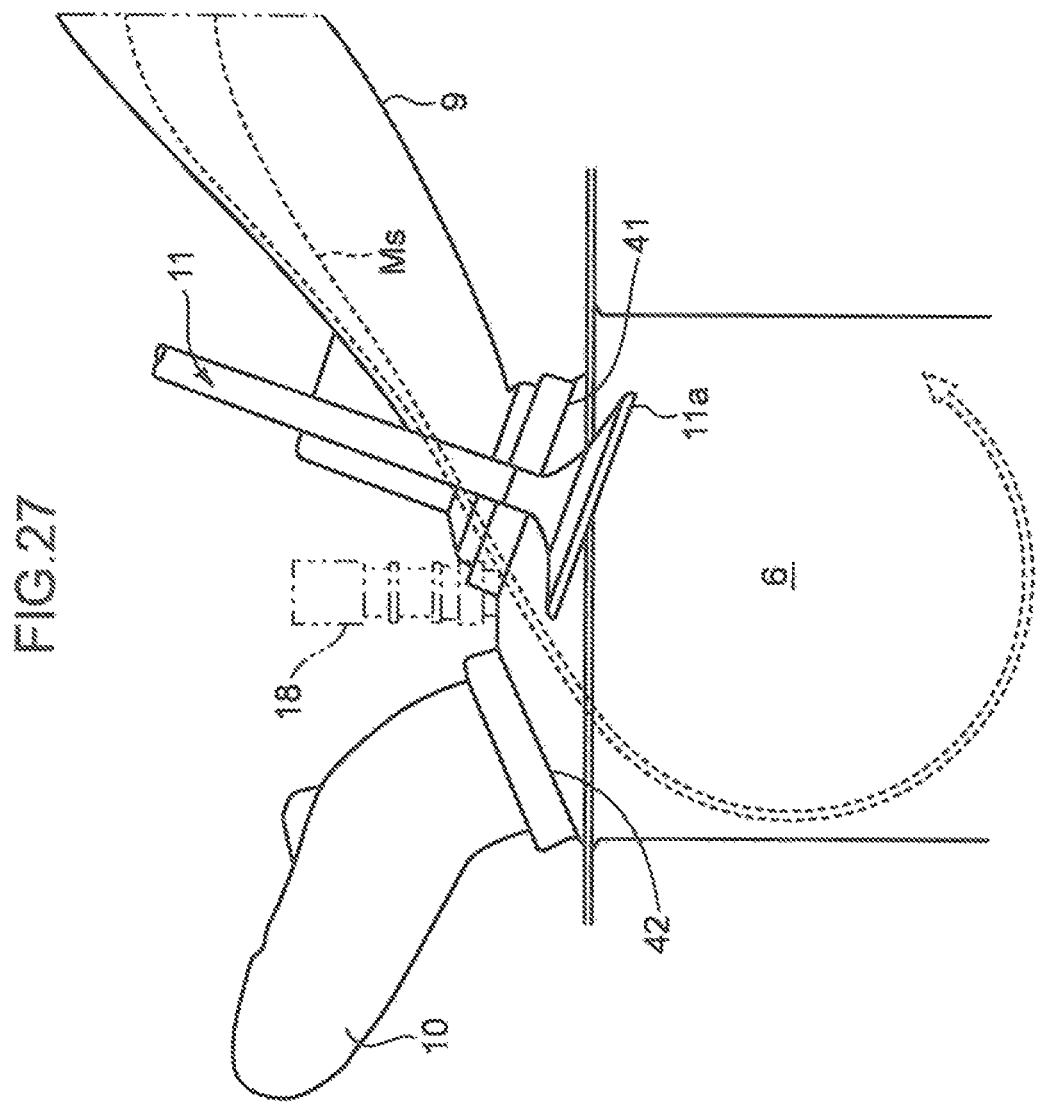

FIG.29
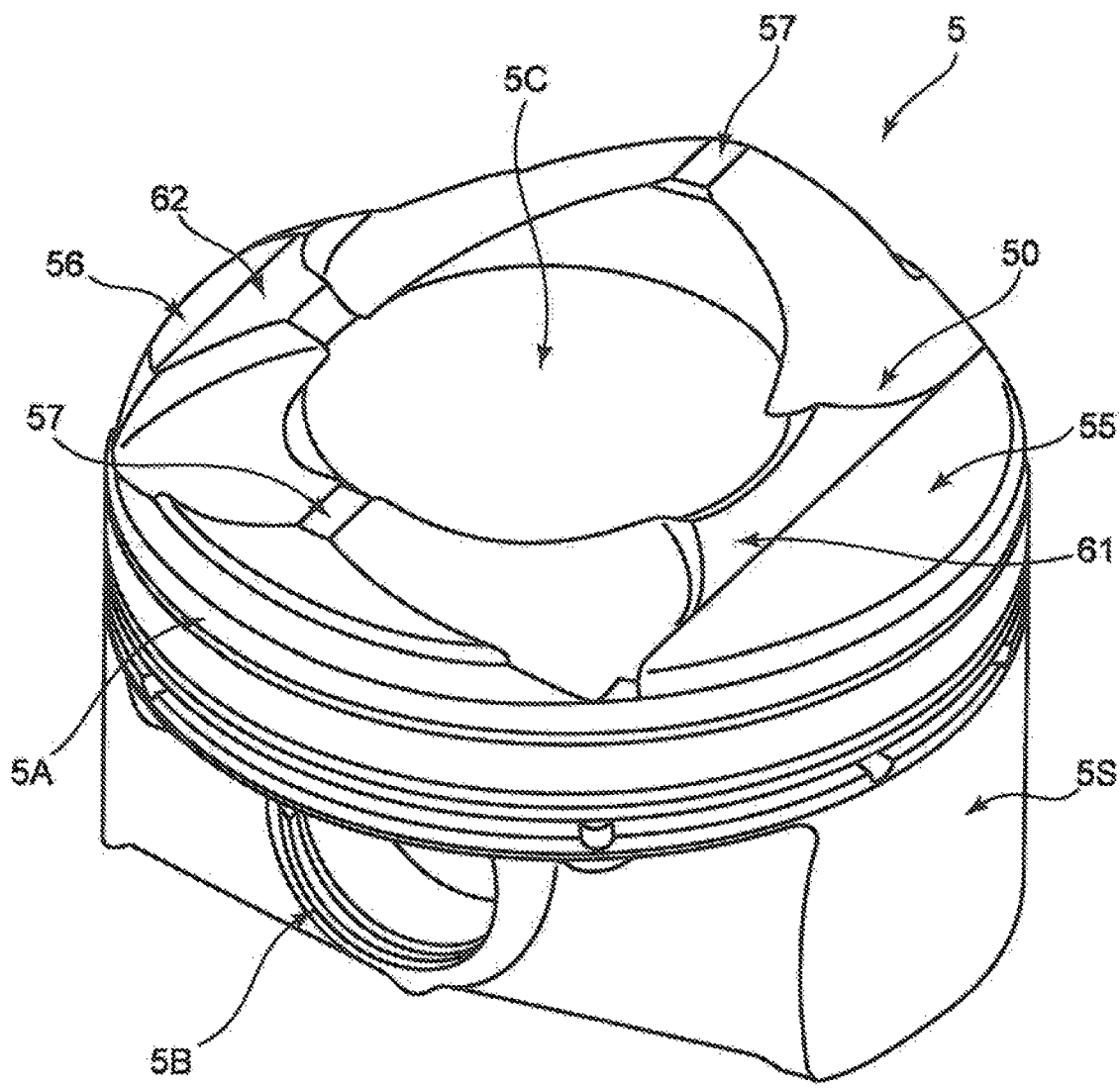
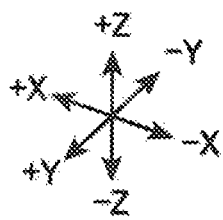

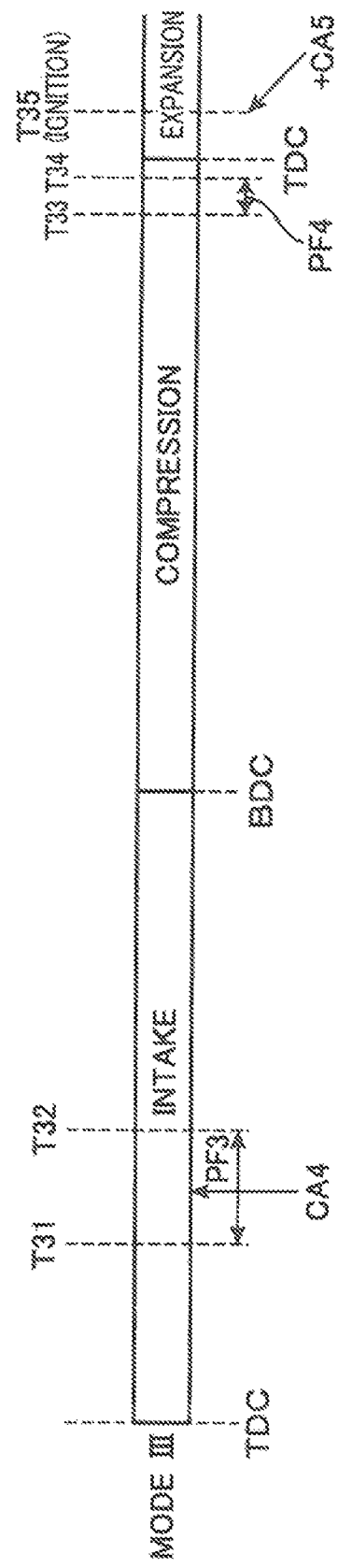

COMBUSTION CHAMBER STRUCTURE FOR ENGINES

TECHNICAL FIELD

The present invention relates to a structure of a combustion chamber for a spark ignited engine.

BACKGROUND ART

In a spark ignited engine for a vehicle such as an automobile, a configuration is employed in which fuel is injected from an injector into a combustion chamber, and an air-fuel mixture acquired by atomizing the injected fuel is ignited using an ignition plug.

When an engine is operated in a high load operating range, a combustion chamber is brought to a high temperature state. In view of the above, in a high load operating range, occurrence of pre-ignition is suppressed by injecting fuel at a timing when a piston is in the vicinity of a compression top dead center.

When fuel is injected at a timing as described above, a time from fuel injection until ignition may be shortened. As a countermeasure for this, it may be considered to employ a configuration, in which fuel is injected toward an exhaust side where an inner wall temperature is relatively high, as disclosed in Patent Literature 1, for example. By employing a configuration described above, it is possible to sufficiently atomize the fuel even when a time from fuel injection until ignition is short.

However, when a relatively large amount of fuel is injected toward an exhaust side, as described in the configuration disclosed in Patent Literature 1, it is concerned that oxygen in the entirety of a combustion chamber may not be consumed in combustion, and unburnt fuel may remain. Specifically, in a case where a relatively large amount of fuel is injected toward an exhaust side, when viewed from the entirety of the combustion chamber, a region where a fuel concentration is high may be generated in a state that fuel remains on the exhaust side, and conversely, a region where a fuel concentration is low may be generated on an intake side or the like. It is concerned that unburnt fuel may remain within the combustion chamber due to such an uneven fuel concentration, and that emission performance may be lowered.

CITATION LIST

Patent Literature

Patent Literature 1: Japanese Unexamined Patent Application Publication No. 2016-94925

SUMMARY OF INVENTION

In view of the above problem, an object of the present invention is to provide a structure of a combustion chamber for an engine, which enables to suppress occurrence of pre-ignition even when the engine is operated in a high load operating range, and to suppress lowering of emission performance by homogeneous combustion in the entirety of a combustion chamber.

The present invention is directed to a structure of a combustion chamber for a spark ignited engine. The structure of a combustion chamber includes: a crown surface of a piston, a combustion chamber ceiling surface formed on a cylinder head, an injector and an ignition plug provided on the combustion chamber ceiling surface, and an intake opening and an exhaust opening opened in a ceiling surface of the combustion chamber. A side where the intake opening is opened is defined as an intake port side of the combustion chamber, and a side where the exhaust opening is opened is defined as an exhaust port side of the combustion chamber, with respect to a position, as a reference, where an ignition portion of the ignition plug is disposed in a plan view from one side in a cylinder axis direction, the injector is configured to inject fuel at least toward the exhaust port side, and a reverse squish flow generation portion which draws an air-fuel mixture toward the intake port side, as the piston moves in an expansion stroke, is provided in the combustion chamber.

BRIEF DESCRIPTION OF DRAWINGS

FIG. 3 is a perspective view of a piston of the engine in FIG. 1.

FIG. 10A is a cross-sectional view illustrating the combustion chamber in a state that the piston is in the vicinity of the compression top dead center.

FIG. 25 is a cross-sectional view illustrating a combustion chamber in which the piston is at a top dead center.

FIG. 27 is a cross-sectional view illustrating a relationship between an intake flow and the injector (nozzle head).

FIG. 29 is a perspective view of a piston.

FIG. 33 is a time chart illustrating a relationship between a fuel injection period and an ignition timing, and a crank angle in mode III.

DESCRIPTION OF EMBODIMENTS

In the following, embodiments of the present invention are described with reference to the drawings. The embodiments described in the following are one aspect according to the present invention. The present invention is not limited by the following embodiments except for an essential configuration thereof.

First Embodiment

[Overall Configuration of Engine]

Figure 1:
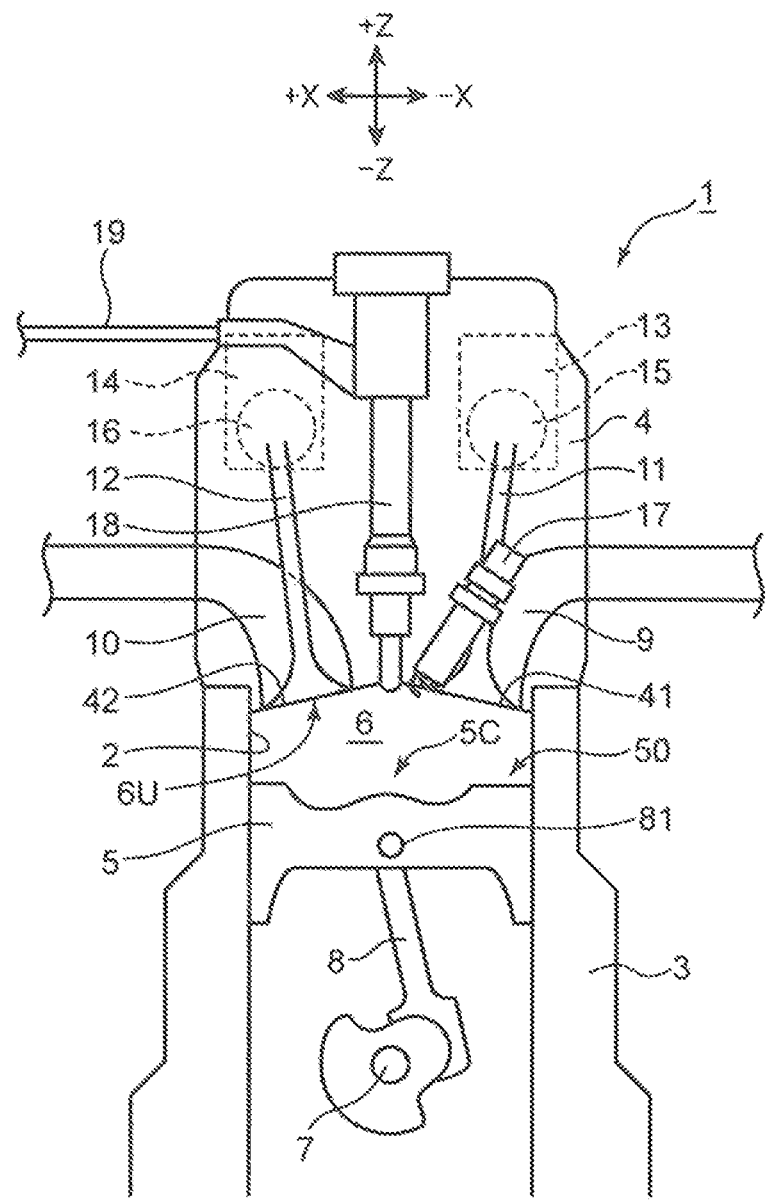
FIG. 1 is a schematic cross-sectional view, in a cylinder axis direction, illustrating an engine to which a structure of a combustion chamber for an engine according to a first embodiment is applied.
Figure 2:
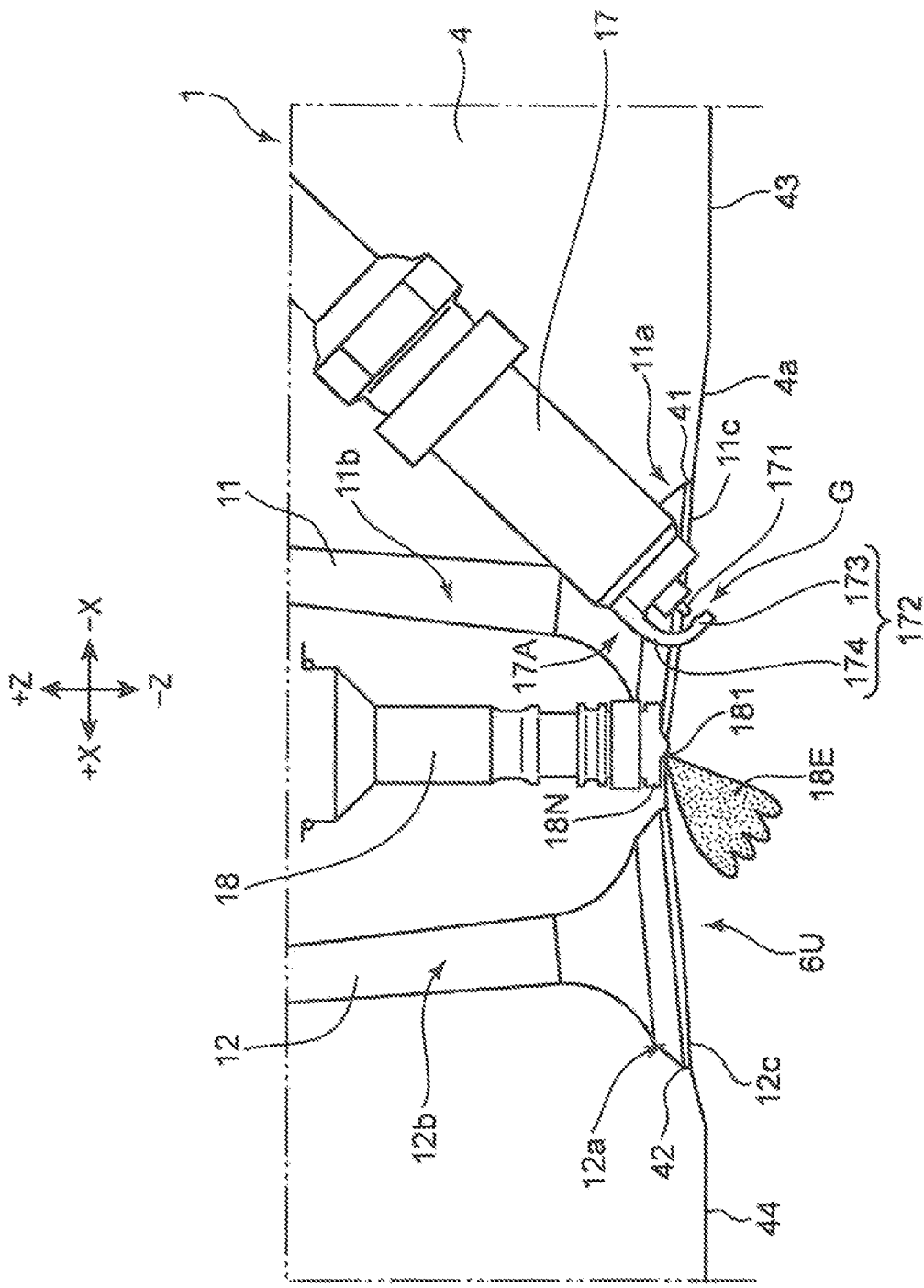
FIG. 2 is a cross-sectional view of essential parts of a cylinder head in FIG. 1.

A structure of a combustion chamber for a spark ignited engine according to a first embodiment is described with reference to the drawings. FIG. 1 is a schematic cross-sectional view illustrating an engine to which the structure of a combustion chamber for the engine according to the first embodiment is applied. FIG. 2 is a cross-sectional view of essential parts of a cylinder head illustrated in FIG. 1. In FIGS. 1, 2, and 3 and thereafter, XYZ directions are indicated. The Z-direction is a cylinder axis direction, the Y-direction is an extending direction of a crankshaft, and the X-direction is a direction orthogonal both to the Z-direction and to the Y-direction.

The engine according to the present embodiment is a multi-cylinder engine including cylinders and pistons, and mounted in a vehicle, as a power source for driving a vehicle such as an automobile. The engine includes an engine body 1, and accessories such as unillustrated intake and exhaust manifolds and various pumps incorporated in the engine body 1. Fuel to be supplied to the engine body 1 contains gasoline as a main component.

The engine body 1 according to the present embodiment is able to perform ordinary spark ignition (SI) combustion in which an air-fuel mixture within a combustion chamber is forcibly ignited by an ignition plug, retard SI combustion in which a fuel injection timing is in the vicinity of a compression top dead center (TDC) in SI combustion, and SICI combustion in which SI combustion and compression ignition (CI) combustion are combined. In SI combustion, fuel is injected in a middle stage of an intake stroke, and an air-fuel mixture is forcibly ignited in the vicinity of a TDC in a compression stroke. In retard SI combustion, fuel is injected before and after a TDC in a compression stroke, and an air-fuel mixture is forcibly ignited in an initial stage of an expansion stroke following the compression stroke. In SICI combustion, an air-fuel mixture within a combustion chamber is forcibly ignited and combusted by flame propagation, and unburnt air-fuel mixture within the combustion chamber is combusted by self-ignition.

In SICI combustion, combustion may be completed by flame propagation without causing self-ignition. These combustion patterns are selected according to an operating range. For example, SI combustion is selected in a high-speed high-load range of the engine, retard SI combustion is selected in a low-speed high-load range, and SICI combustion is selected in a low load range without depending on a rotational speed, respectively.

The engine body 1 includes a cylinder block 3, a cylinder head 4, and pistons 5. The cylinder block 3 includes a plurality of cylinders 2 (only one cylinder 2 is illustrated in FIG. 1), which are arranged in a direction perpendicular to the plane of FIG. 1. The cylinder head 4 is mounted on the cylinder block 3, and closes an upper opening of the cylinder 2. The piston 5 is accommodated within each of the cylinders 2 in such a way that the piston 5 can slidingly reciprocate. The pistons 5 are connected to a crankshaft 7 via a connecting rod 8. The crankshaft 7 is rotated around an axis thereof, as the piston 5 slidingly reciprocates. A structure of the piston 5 will be described later.

A combustion chamber 6 is formed above the piston 5. An intake port 9 and an exhaust port 10 communicating with the combustion chamber 6 are formed in the cylinder head 4. A bottom surface 4a of the cylinder head 4 is a combustion chamber ceiling surface 6U. The combustion chamber ceiling surface 6U has a pent-roof shape (flat pent-roof shape), which is slightly projected upwardly. An intake-side opening portion (intake opening) 41 as a downstream end of the intake port 9, and an exhaust-side opening portion (exhaust opening) 42 as an upstream end of the exhaust port 10 are formed in the combustion chamber ceiling surface 6U. An intake valve 11 for opening and closing the intake-side opening portion 41, and an exhaust valve 12 for opening and closing the exhaust-side opening portion 42 are mounted in the cylinder head 4.

The engine body 1 according to the present embodiment is a double overhead camshaft (DOHC) engine. Two intake-side opening portions 41 and two exhaust-side opening portions 42 are formed in each of the cylinders 2, and two intake valves 11 and two exhaust valves 12 are provided for each of the cylinders 2.

As illustrated in FIG. 2, the intake valve 11 and the exhaust valve 12 are so-called poppet valves. The intake valve 11 includes an umbrella-shaped valve body 11a which opens and closes the intake-side opening portion 41, and a stem 11b which extends perpendicularly from the valve body 11a. In the same manner, the exhaust valve 12 includes an umbrella-shaped valve body 12a which opens and closes the exhaust-side opening portion 42, and a stem 12b which extends perpendicularly from the valve body 12a. The valve body 11a of the intake valve 11 includes a valve surface 11c facing the combustion chamber 6. The valve body 12a of the exhaust valve 12 includes a valve surface 12c facing the combustion chamber 6.

In the present embodiment, a combustion chamber wall surface defining the combustion chamber 6 consists of an inner wall surface of the cylinder 2, a crown surface 50 which is a top surface (+Z side surface) of the piston 5, the bottom surface 4a of the cylinder head 4, the valve surface 11c of the intake valve 11, and the valve surface 12c of the exhaust valve 12. Specifically, the cylinder block 3, the cylinder head 4, the piston 5, and the valves 11 and 12 are combustion chamber constituent members constituting the combustion chamber 6.

An intake-side valve mechanism 13 which drives the intake valve 11, and an exhaust-side valve mechanism 14 which drives the exhaust valve 12 are disposed in the cylinder head 4. The intake valve 11 and the exhaust valve 12 are driven in association with rotation of the crankshaft 7 by the valve mechanisms 13 and 14. By driving of the intake valve 11 and the exhaust valve 12, the valve body 11a of the intake valve 11 opens and closes the intake-side opening portion 41, and the valve body 12a of the exhaust valve 12 opens and closes the exhaust-side opening portion 42.

An intake-side variable valve timing mechanism (intake-side VVT) 15 is incorporated in the intake-side valve mechanism 13. Furthermore, an exhaust-side variable valve timing mechanism (exhaust-side VVT) 16 is incorporated in the exhaust side valve mechanism 14. The intake-side VVT 15 is an electrically operated VVT provided on an intake camshaft, and the exhaust-side VVT 16 is an electrically operated VVT provided on an exhaust camshaft. The intake-side VVT 15 changes an opening-closing timing of the intake valve 11 by sequentially changing a rotational phase of the intake camshaft with respect to the crankshaft 7 within a predetermined angle range. The exhaust-side VVT 16 changes an opening-closing timing of the exhaust valve 12 by sequentially changing a rotational phase of the exhaust camshaft with respect to the crankshaft 7 within a predetermined angle range.

An ignition plug 17 which supplies ignition energy to an air-fuel mixture within the combustion chamber 6 is mounted in the cylinder head 4 for each of the cylinders 2. An ignition portion 17A is provided at a distal end of the ignition plug 17. The ignition plug 17 is mounted in the cylinder head 4 in a state that the ignition portion 17A faces the combustion chamber 6. The ignition plug 17 discharges sparks from a distal end thereof in response to power supply from an illustrated ignition circuit, and ignites the air-fuel mixture within the combustion chamber 6.

An injector 18 (fuel injection valve), which injects fuel containing gasoline as a main component from a distal end thereof into the combustion chamber 6, is mounted in the cylinder head 4 (combustion chamber ceiling surface 6U) for each of the cylinders 2. A fuel supply pipe 19 is connected to the injector 18. The injector 18 injects fuel supplied through the supply pipe 19 into the combustion chamber 6 (injected fuel 18E). As illustrated in FIG. 2, in the present embodiment, fuel is injectable from the injector 18 at least toward the exhaust port side (+X side) within the combustion chamber 6.

Although illustration is omitted, a high-pressure fuel pump constituted of a plunger-type pump or the like, which is cooperatively connected to the crankshaft 7, is connected to an upstream portion of the fuel supply pipe 19. Further, a common rail for accumulating a pressure among all the cylinders 2 is provided between the high-pressure fuel pump and the fuel supply pipe 19. With this configuration, fuel of a high pressure is injected from the injector 18 into the combustion chamber 6.

[Detailed Structure of Piston]

Figure 4:
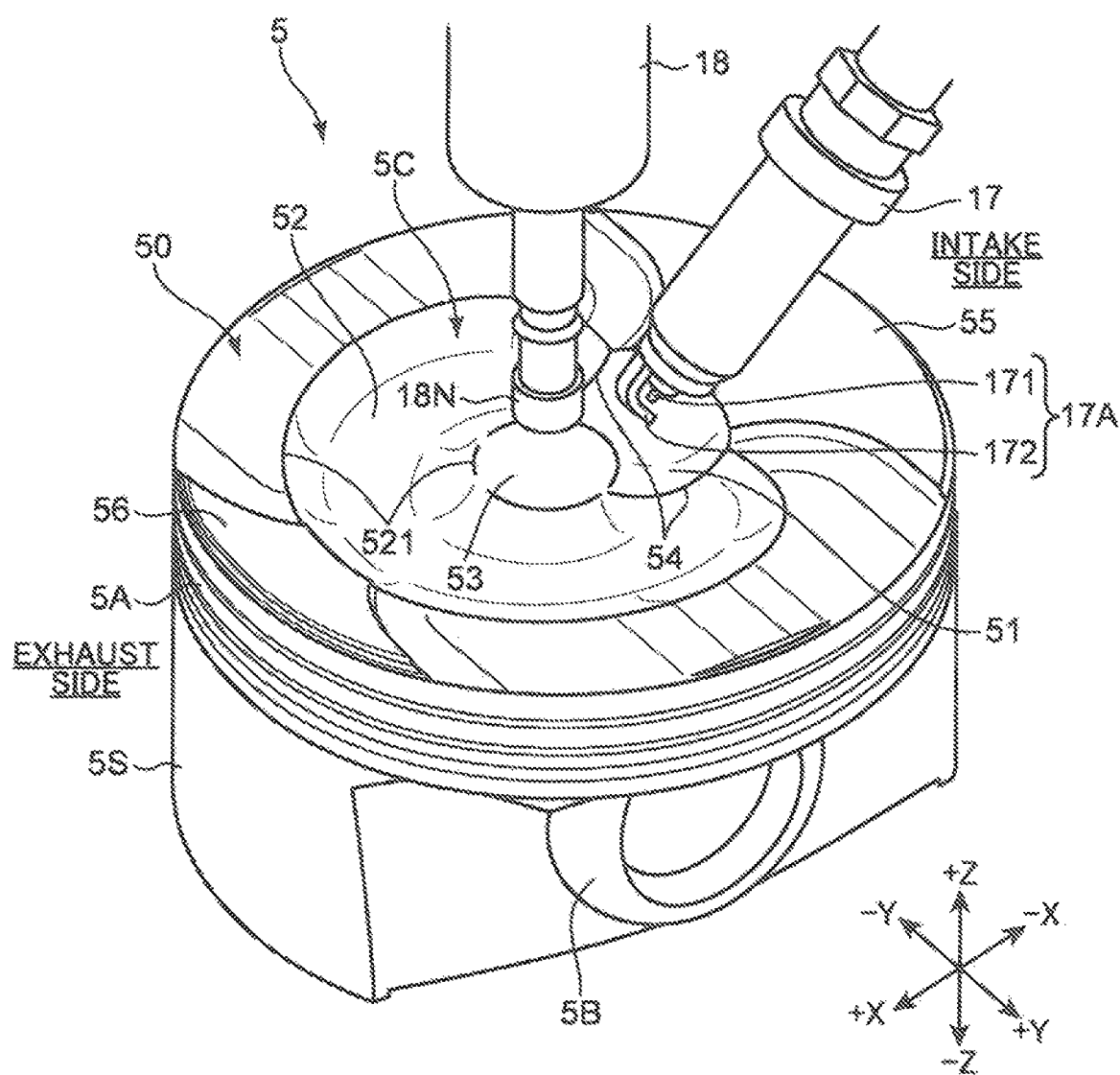
FIG. 4 is a perspective view illustrating a layout of an ignition plug and an injector with respect to the piston.
Figure 5:
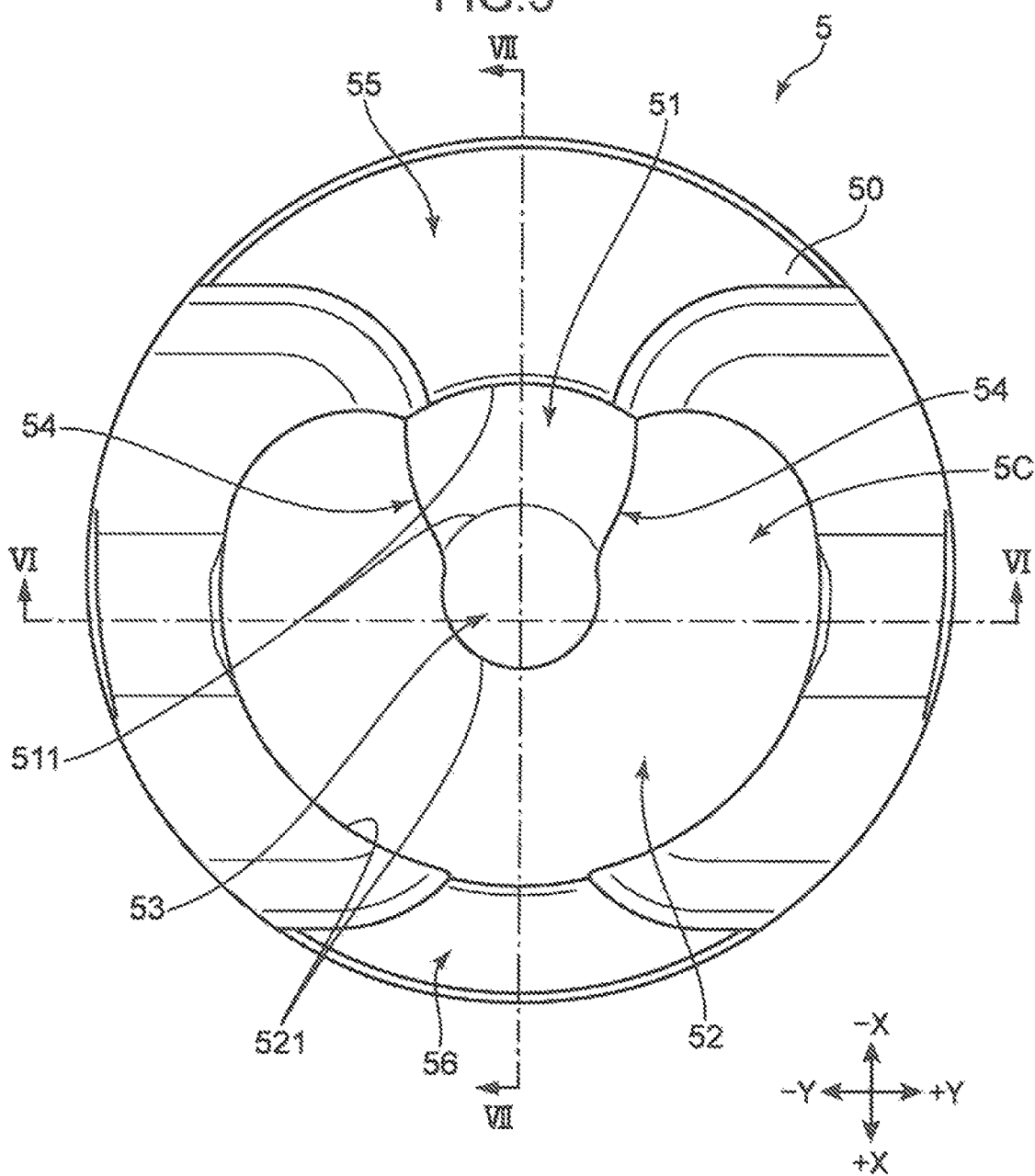
FIG. 5 is a plan view of a crown surface of the piston.
Figure 6:
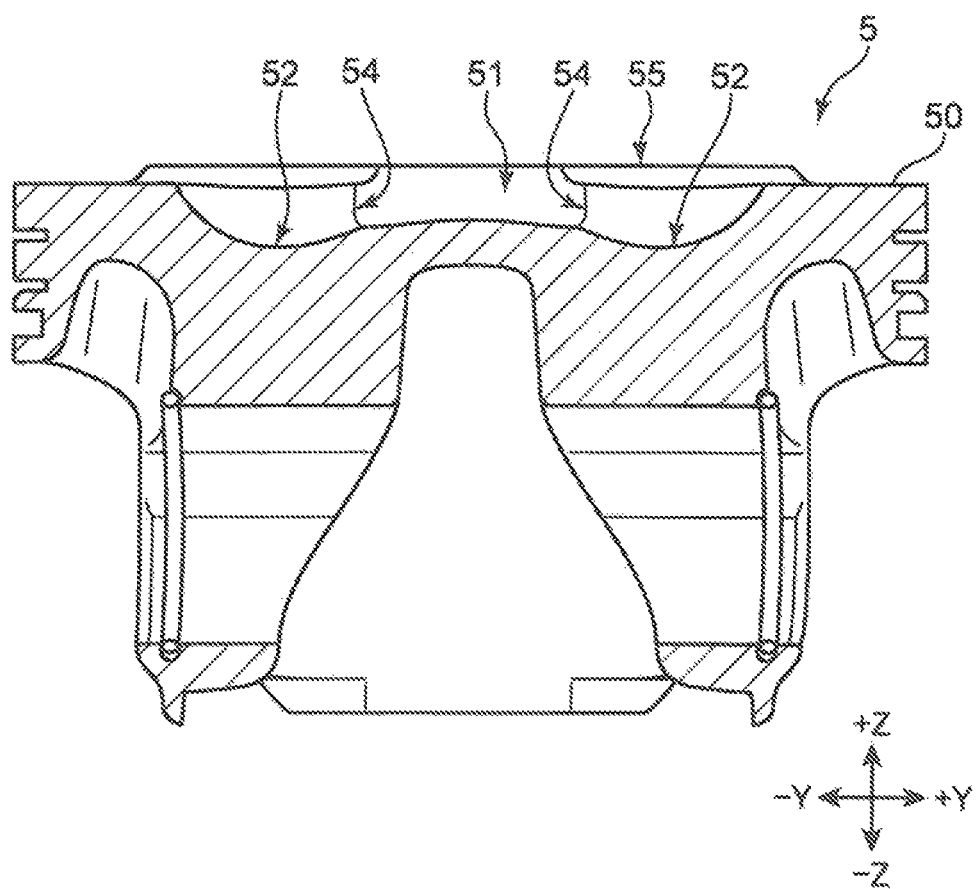
FIG. 6 is a cross-sectional view taken along the line VI-VI in FIG. 5.
Figure 7:
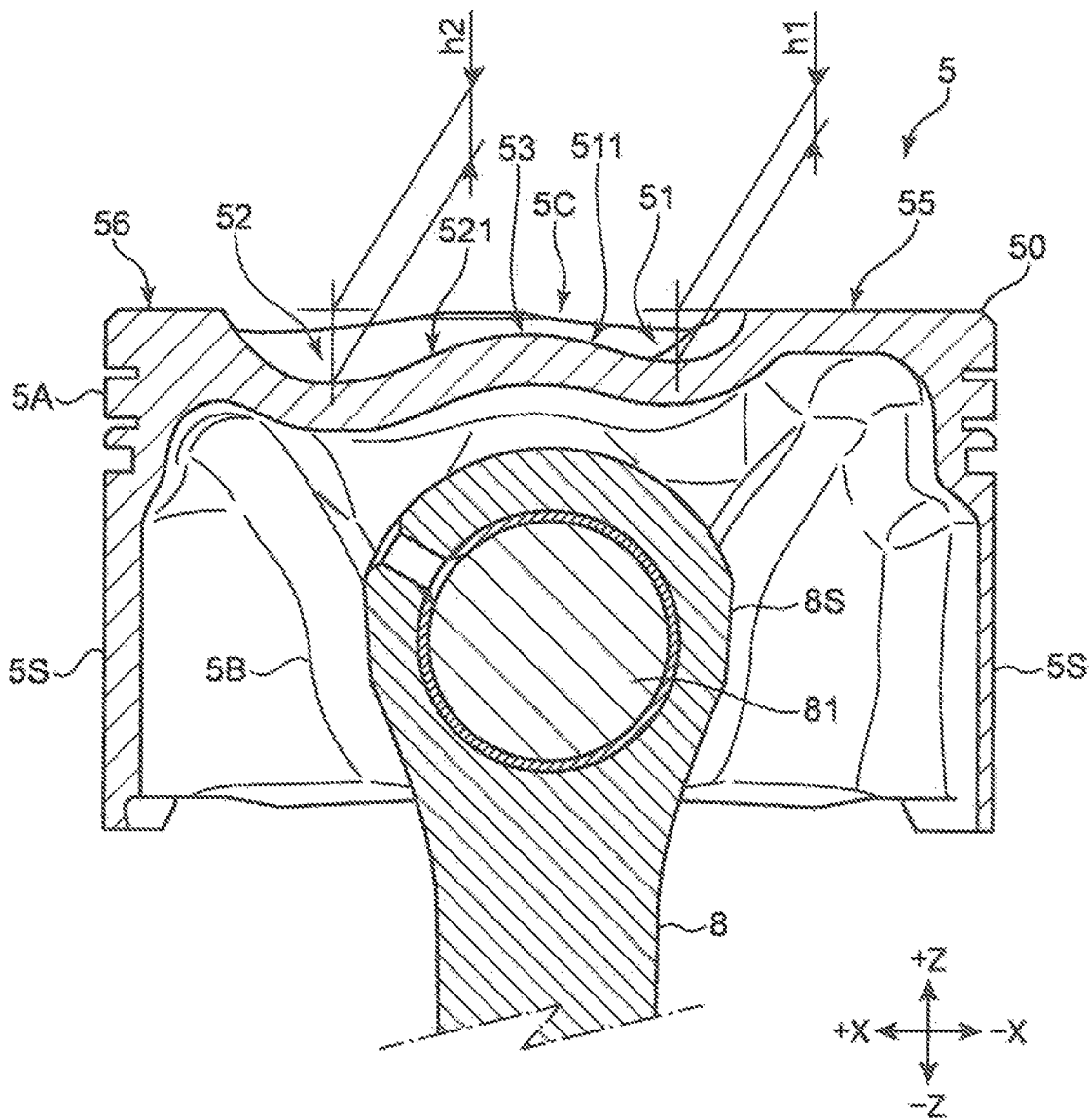
FIG. 7 is a cross-sectional view taken along the line VII-VII in FIG. 5.

A structure of the piston 5, specifically, a structure of the crown surface 50 is described in detail with reference to FIGS. 3 to 7. FIG. 3 is a perspective view of the piston 5. FIG. 4 is a perspective view illustrating a layout relationship between the crown surface 50 of the piston 5, and the ignition plug 17 and the injector 18. FIG. 5 is a plan view of the crown surface 50. Further, FIG. 6 is a cross-sectional view taken along the line VI-VI in FIG. 5, and FIG. 7 is a cross-sectional view taken along the line VII-VII in FIG. 5.

The piston 5 includes a piston head 5A, and a skirt portion 5S connected to the lower side (−Z side) of the piston head 5A. The piston head 5A has a circular columnar body. The piston head 5A includes the crown surface 50 constituting a part (bottom surface) of a wall surface of the combustion chamber 6 on a top surface thereof, and a peripheral surface which slidingly contacts with an inner wall surface of the cylinder 2. The skirt portion 5S is disposed on the +X side and the −X side of the piston head 5A, and suppresses swing motion of the piston head 5A, when the piston 5 reciprocates. As illustrated in FIG. 7, a piston boss 5B which defines a pinhole extending in the Y-direction is provided below the piston head 5A. A piston pin 81 is inserted into the pinhole of the piston boss 5B. The piston pin 81 is a pin which connects a small end portion 8S of the connecting rod 8, and the piston 5.

The crown surface 50 is a surface which is opposed to the combustion chamber ceiling surface 6U in the Z-direction, and includes a substantially annular-shaped cavity 5C in a substantially middle portion in a radial direction (X-direction and Y-direction) thereof. The cavity 5C is a portion which is recessed toward the −Z side, and is a portion which receives fuel injection from the injector 18. An intake-side flat portion 55, an exhaust-side flat portion 56, and a pair of lateral upper surfaces 57 are formed on the outer periphery of the cavity 5C in the crown surface 50. The intake-side flat surface 55 is a flat surface formed in an area adjacent to the cavity 5C on the −X side. The exhaust-side flat portion 56 is a flat surface formed in an area adjacent to the cavity 5C on the +X side. The paired lateral upper surfaces 57 are substantially flat surfaces respectively adjacent to the cavity 5C on the +Y side and the −Y side. Furthermore, a projection portion 53 bulging toward the +Z side with respect to a bottom portion of the cavity 5C is provided on an inner portion of the cavity 5C.

The intake-side flat portion 55 is provided in such a way as to be parallel to an intake-side top surface 43 of the cylinder head 4 illustrated in FIG. 2 with a slight gap therebetween, when the piston 5 is in the vicinity of a top dead center (TDC). Likewise, the exhaust-side flat portion 56 is provided in such a way as to be parallel to an exhaust-side top surface 44 of the cylinder head 4 illustrated in FIG. 2, when the piston 5 is in the vicinity of a top dead center (TDC). In the engine body 1, a reverse squish flow generation portion is formed by combination of the intake-side flat portion 55 and the intake-side top surface 43. Specifically, the reverse squish flow generation portion is a portion which generates a flow of air-fuel mixture from a radially middle region of the combustion chamber 6 toward a radially periphery region of the combustion chamber 6, when the piston 5 is lowered from the vicinity of a top dead center (TDC) toward the −Z side.

The cavity 5C includes a small cavity 51 and a large cavity 52. As illustrated in FIG. 4, the small cavity 51 is provided to be depressed in a position associated with the ignition portion 17A of the ignition plug 17, in other words, in a position immediately below the ignition portion 17A. The large cavity 52 is provided to be depressed in a position adjacent to the small cavity 51, and has a projection area larger than a projection area of the small cavity 51 in a plan view from the +Z side. For example, a projection area of the large cavity 52 is about eight times of a projection area of the small cavity 51. The projection portion 53 is provided near a middle of the crown surface 50 in the XY direction. The projection portion 53 is provided substantially at a middle of the combustion chamber 6 in the XY plane direction, and is projected at a position immediately below a nozzle head 18N (see FIG. 4) of the injector 18.

The small cavity 51 includes a first rim 511 being an outer rim which defines the small cavity 51. The large cavity 52 includes a second rim 521 being an outer rim which defines the large cavity 52. The first rim 511 has a substantially fan shape in a plan view from the +Z side, and serves as a borderline with respect to the projection portion 53, the intake-side flat portion 55, and the large cavity 52. The second rim 521 has a substantially C-shape in a plan view from the +Z side. In other words, the large cavity 52 has a substantially C-shape in a plan view of the crown surface 50 from the +Z side. The second rim 521 serves as a borderline with respect to the projection portion 53, the intake-side flat portion 55, the exhaust-side flat portion 56, and the small cavity 51.

A part of the first rim 511 is a common rim portion serving as a part of the second rim 521. In other words, a part of the first rim 511 of the small cavity 51 comes into contact with a part of the second rim 521 of the large cavity 52 at a boundary. More specifically, a portion except for an arc-shaped portion of the first rim 511, which defines a boundary with respect to each of the projection portion 53 and the intake-side flat portion 55, is common to a part of the second rim 521. The part of the second rim 521 is equivalent to an opened portion (opened end edge) of the C-shape. As illustrated in FIG. 4 and the like, the common rim portion is a ridge line 54 projecting upwardly. Specifically, in the present embodiment, the small cavity 51 and the large cavity 52 are adjacent to each other with the ridge line 54 being the border thereof.

As illustrated in FIG. 5 and the like, the large cavity 52 has a C-shape in such a way that the large cavity 52 surrounds the projection portion 53 having a substantially circular shape in a plan view from the +Z side. The small cavity 51 is formed at a position where the small cavity 51 overlaps the C-shaped opened portion of the large cavity 52. Thus, although being partitioned by the ridge line 54, the substantially annular-shaped cavity 5C surrounding a periphery of the projection portion 53 is formed in the crown surface 50 by the small cavity 51 and the large cavity 52.

Furthermore, a rim portion 531 on the outer periphery of the projection portion 53 comes into contact with a part of the first rim 511 of the small cavity 51 and a part of the second rim 521 of the large cavity 52 at a boundary. In the present embodiment, the projection portion 53 has a mountain shape, and the rim portion 531 serves as a foot of the mountain.

A plurality of injection holes 181 are radially provided in the nozzle head 18N of the injector 18. Fuel is injected through each of the injection holes of the nozzle head 18N toward the small cavity 51 and the large cavity 52. At this occasion, the injected fuel 18E is smoothly introduced into the cavities 51 and 52 along the first rim 511 and the second rim 521 which are slant faces.

As illustrated in FIG. 7, a depth h2 of the large cavity 52 with respect to the intake-side flat portion 55 and the exhaust-side flat portion 56 as a reference is deeper than a depth h1 of the small cavity 51. Thus, a depth of a bottom surface of the cavity 5C decreases, as the bottom surface extends from the exhaust port side (+X side) toward the intake port side (−X side). More specifically, a bottom surface of the cavity 5C is gradually raised upwardly (toward the +Z side), as extending from the +X side toward a position immediately below the ignition portion 17A of the ignition plug 17.

Furthermore, as described above, a projection area of the large cavity 52 is larger than a projection area of the small cavity 51. Therefore, when the depths h1 and h2 (recess depths) of the cavities 51 and 52 are taken into consideration altogether, the large cavity 52 is formed to have a large volume, as compared with the small cavity 51.

[Fuel Injection Period and Ignition Timing, and Crank Angle]

Figure 8:
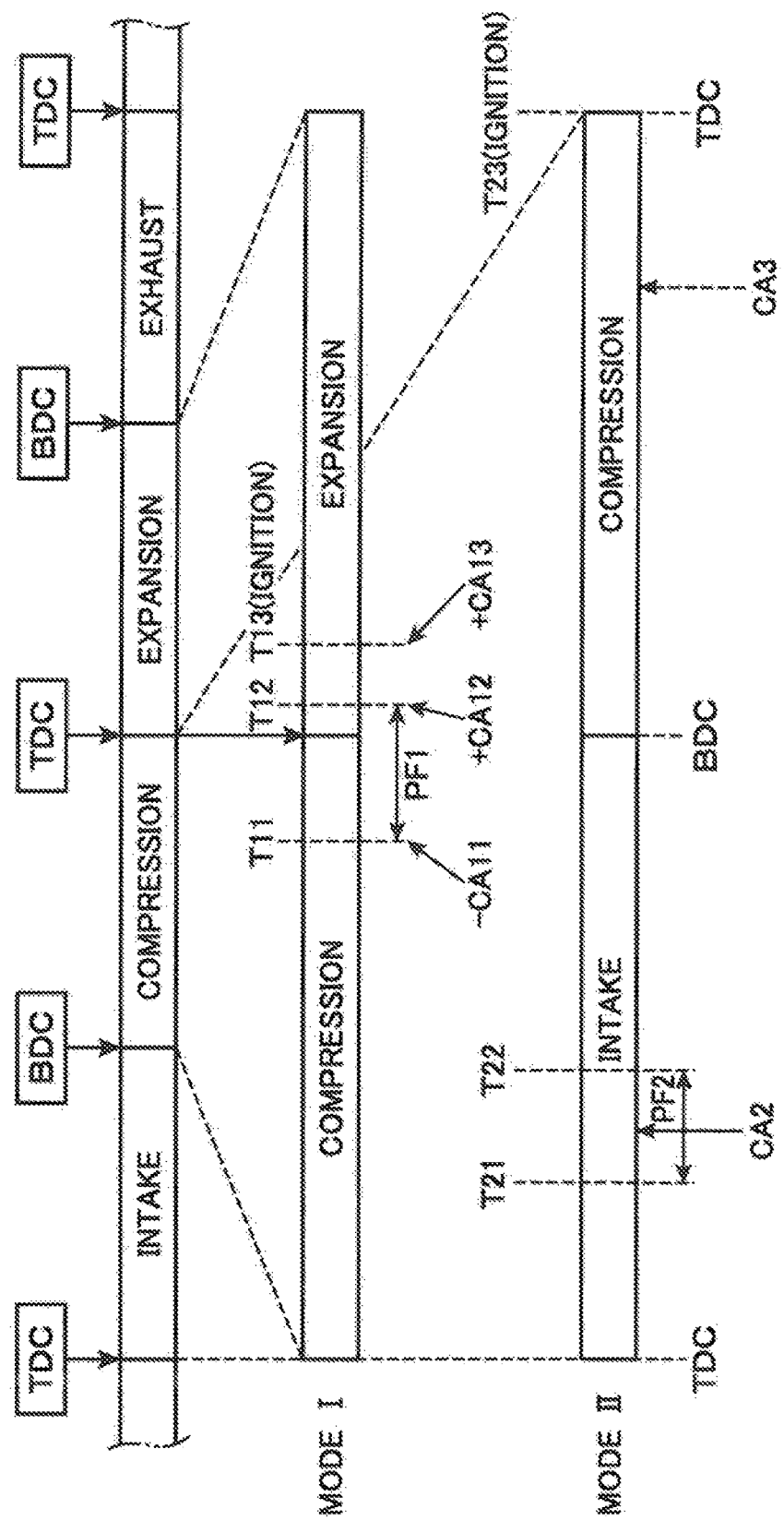
FIG. 8 is a time chart illustrating a relationship between a fuel injection period and an ignition timing, and a crank angle.

A relationship between a fuel injection period and an ignition timing, and a crank angle is described with reference to FIG. 8. FIG. 8 is a time chart illustrating a relationship between a fuel injection period and an ignition timing, and a crank angle.

As illustrated in FIG. 8, the engine body 1 according to the present embodiment is operated at least according to a fuel injection period and an ignition timing in mode I and mode II.

The mode I is employed when the above-described retard SI combustion is performed. A fuel injection period PF1 is before and after a TDC in a compression stroke, and the ignition timing is in an initial stage of an expansion stroke. Specifically, fuel injection by the injector 18 is started at a timing T11 associated with a crank angle −CA11 in a last stage of a compression stroke before the TDC, and the fuel injection is continued until a timing T12 associated with a crank angle +CA12 in an initial stage when an expansion stroke is started after the TDC. Thereafter, the air-fuel mixture is ignited by the ignition plug 17 at a timing T13 associated with a predetermined crank angle +CA13 in the initial stage of the expansion stroke. Each of the crank angles is such that, for example, −CA11 is 15° before the TDC (more preferably, 10° before the TDC), +CA12 is 5° after the TDC (more preferably, 2° after the TDC), and +CA13 is 8 to 10° after the TDC in a compression stroke (more preferably, 9° after the TDC). In the mode I, since fuel is injected before and after the TDC, it is possible to prevent occurrence of knocking phenomenon.

The mode II is employed when the above-described SI combustion and SICI combustion are performed. A fuel injection period PF2 is in a middle stage of an intake stroke, and the ignition timing is a vicinity of a TDC in a compression stroke. Specifically, a period from a timing T21 until a timing T22 is set as the fuel injection period PF2, a crank angle CA2 being interposed between the timings T21 and T22, the crank angle CA2 corresponding to a position at which the piston 5 is lowered about a half in the stroke from a TDC in an exhaust stroke. The ignition timing is a timing T23 when the piston 5 reaches the TDC. The crank angle CA2 is, for example, 70° after the TDC.

Fuel injection may be additionally performed at a timing associated with a crank angle CA3 before a TDC, in addition to the timing associated with the crank angle CA2 for preventing occurrence of knocking phenomenon.

[Reverse Squish Flow]

Figure 9:
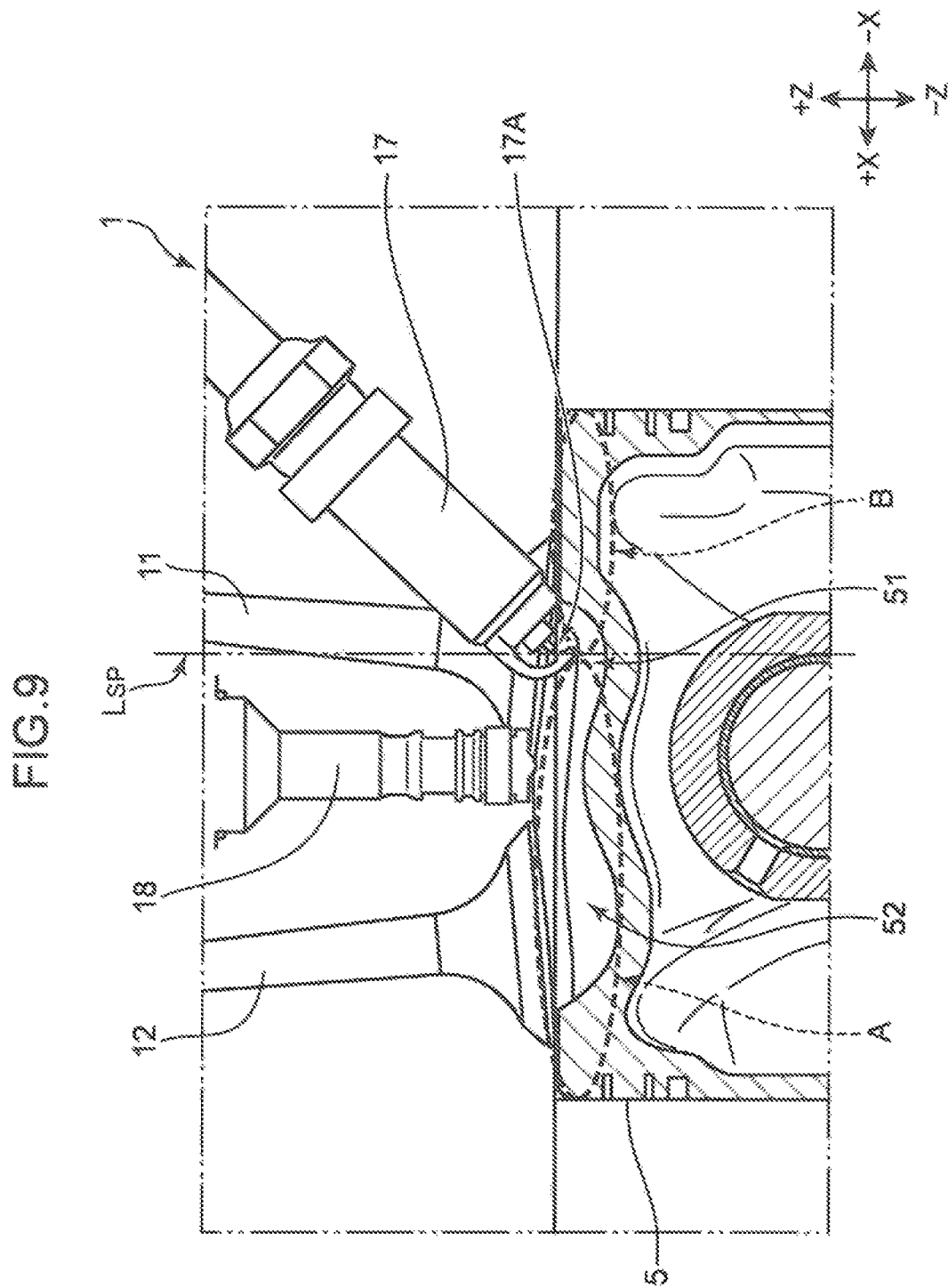
FIG. 9 is a cross-sectional view illustrating the combustion chamber in a state that the piston is in the vicinity of a compression top dead center.
Figure 10B:
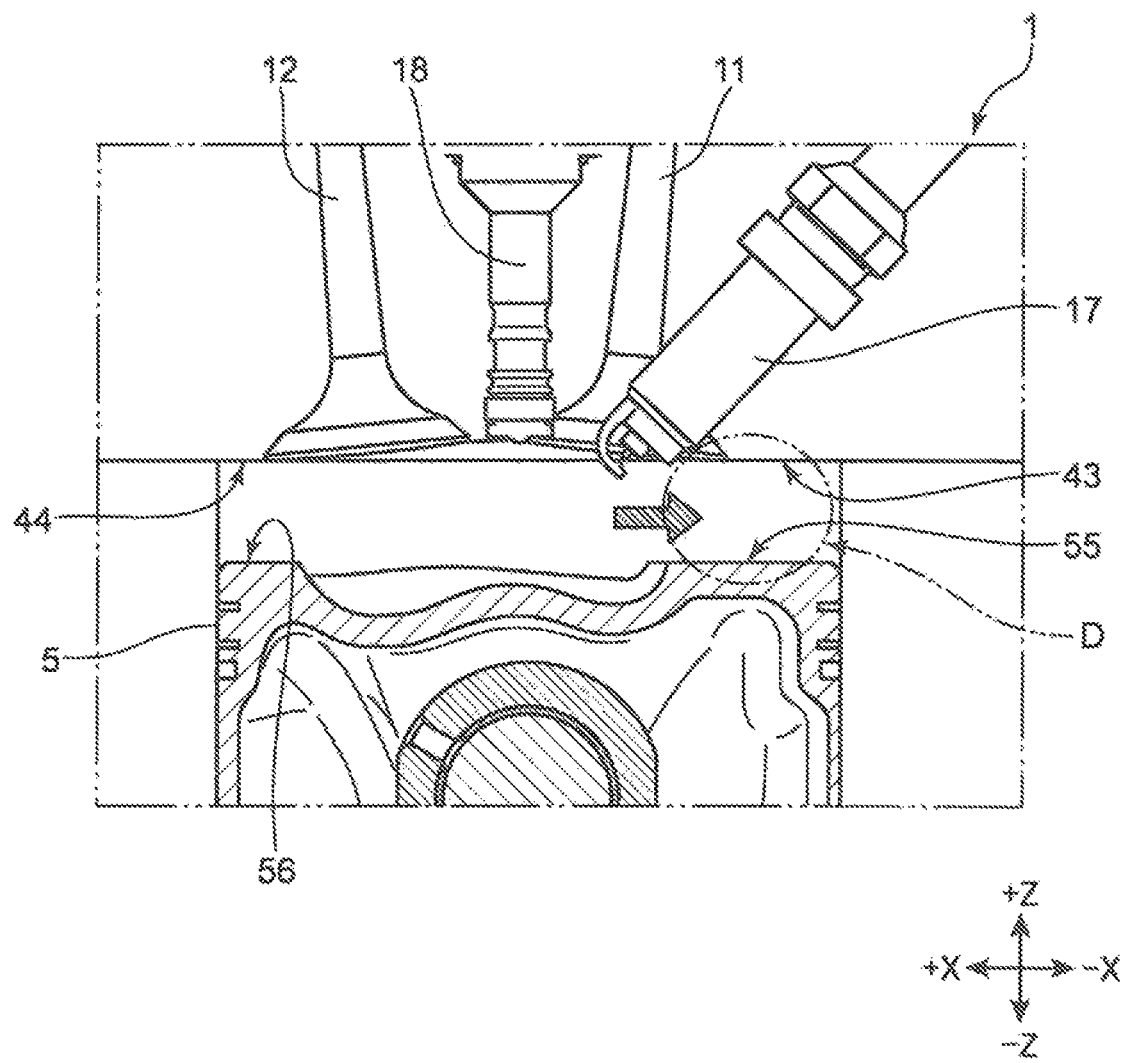
FIG. 10B is a cross-sectional view illustrating the combustion chamber in a state that the piston is lowered after reaching the compression top dead center.

A reverse squish flow generated within the combustion chamber 6 is described with reference to FIGS. 9, 10A, and 10B. FIGS. 9 and 10A are cross-sectional views illustrating the combustion chamber 6, when the piston 5 is in the vicinity of a TDC. FIG. 10B is a cross-sectional view illustrating the combustion chamber 6, when the piston 5 is lowered after reaching the TDC.

First, as illustrated in FIG. 9, an imaginary line LSP passing through the ignition portion 17A of the ignition plug 17 and extending in the Z-direction is drawn.

When the piston 5 is in the vicinity of a TDC as illustrated in FIG. 9, comparison is made between a portion (portion A: a portion indicated by the arrow A) on the +X side with respect to the imaginary line LSP, and a portion (portion B: a portion indicated by the arrow B) on the −X side with respect to the imaginary line LSP. As is clear from FIG. 9, in a structure of the combustion chamber 6 according to the present embodiment, the volume of the portion B is smaller than the volume of the portion A.

Within the combustion chamber 6, a reverse squish flow, which draws an air-fuel mixture from the +X side toward the −X side along with the piston 5 being lowered in an expansion stroke, is generated due to the above-described difference in the volume of the combustion chamber. Specifically, within the combustion chamber 6, a reverse squish flow generation portion is formed by the above-described difference in the volume of the combustion chamber.

Next, as illustrated in FIG. 10A, when the piston 5 is in the vicinity of the TDC, the crown surface 50 of the piston 5 comes closest to the combustion chamber ceiling surface 6U. Therefore, the intake-side flat portion 55 is opposed to the intake-side top surface 43 with a slight gap therebetween (see the portion indicated by the arrow C), and the exhaust-side flat portion 56 is also opposed to the exhaust-side top surface 44 with a slight gap therebetween.

As illustrated in FIG. 10B, in an expansion stroke after the TDC, as the piston 5 is lowered, the intake-side flat portion 55 leaves from the intake-side top surface 43 (see the portion indicated by the arrow D), and the exhaust-side flat portion 56 also leaves from the exhaust-side top surface 44. At this occasion, as indicated by the hatched arrow, a reverse squish flow toward the −X side (flow which draws an air-fuel mixture into a region on the −X side) is generated. In the present embodiment, a reverse squish flow generation portion is constituted by the intake-side flat portion 55 and the intake-side top surface 43.

Although the exhaust-side flat portion 56 and the exhaust-side top surface 44 are also parallel to each other, regarding the piston 5 and the combustion chamber ceiling surface 6U, an area where the intake-side flat portion 55 and the intake-side top surface 43 are opposed to each other is larger than an area where the exhaust-side flat portion 56 and the exhaust-side top surface 44 are opposed to each other. Therefore, a reverse squish flow as indicated by the arrow is generated.

In the state illustrated in FIG. 10A, the exhaust-side flat portion 56 and the exhaust-side top surface 44, which are opposed and in proximity to each other, are provided. Thus, direct adhesion of injected fuel onto an inner wall surface (cylinder liner) of the cylinder 2 is prevented, when fuel is injected when the piston 5 is in the vicinity of a TDC. Thus, generation of deposits is suppressed.

[Swirl Flow]

Figure 11:
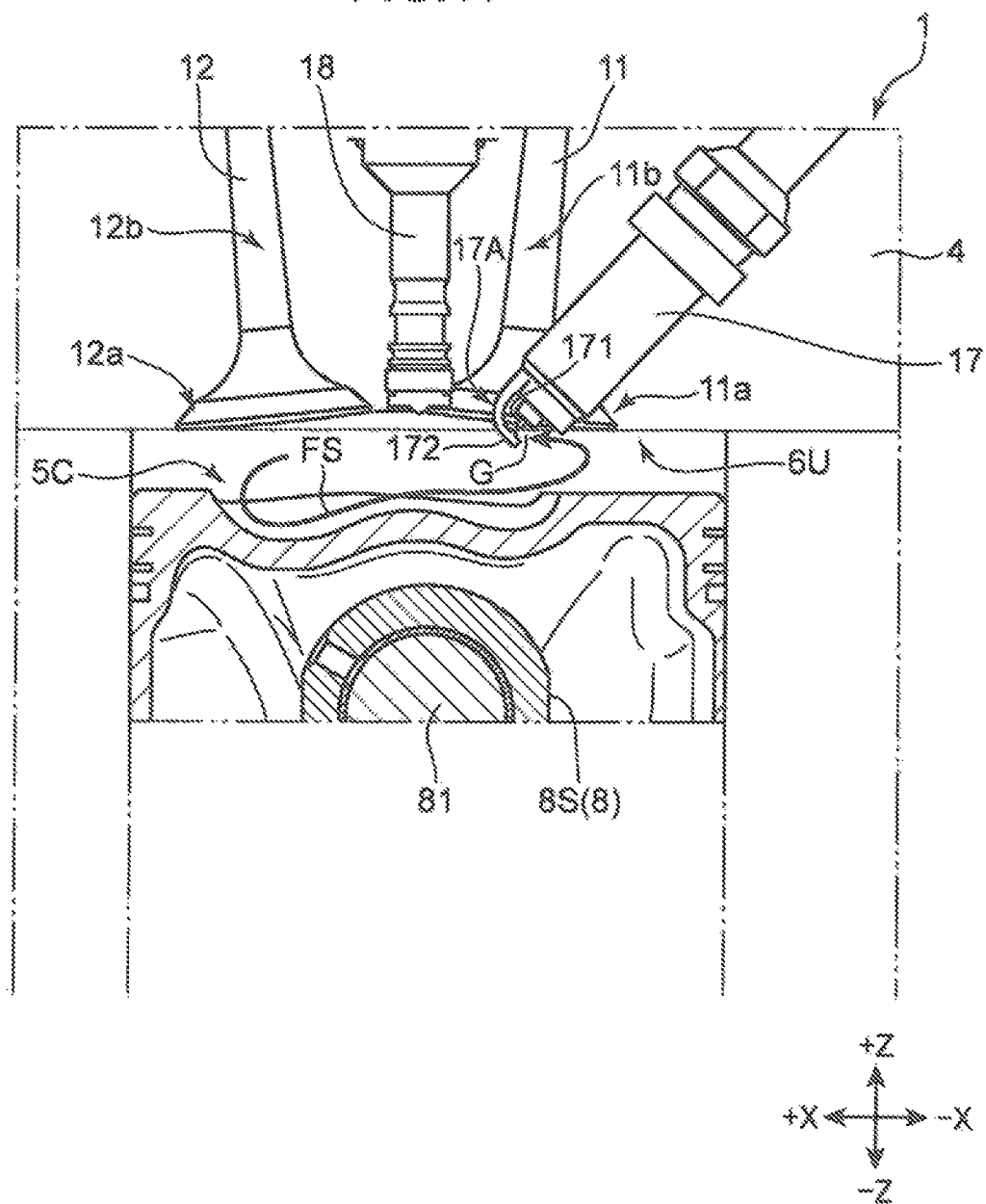
FIG. 11 is a cross-sectional view illustrating a layout of a swirl flow generated within the combustion chamber, and an ignition portion of the ignition plug.
Figure 12:
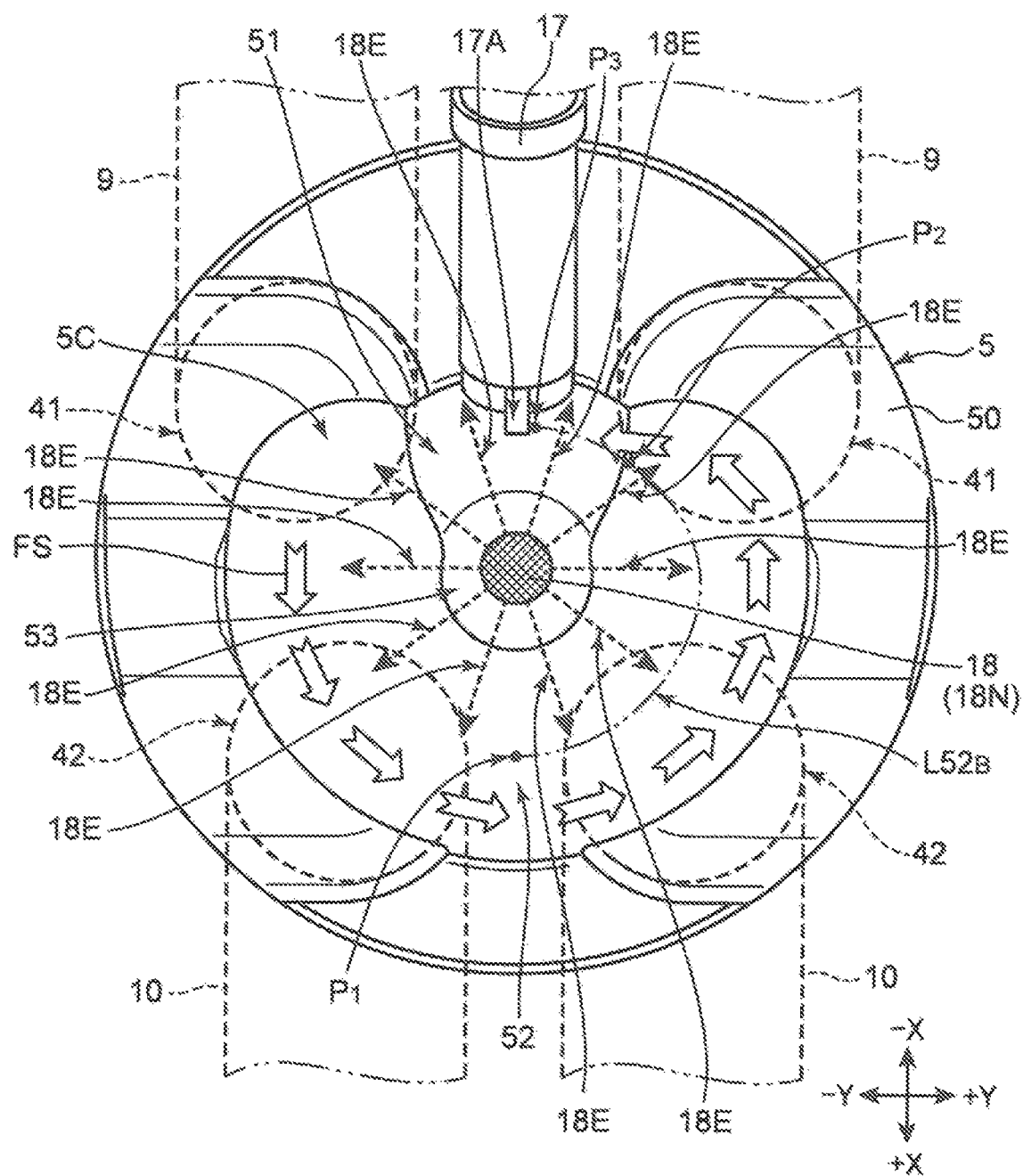
FIG. 12 is a plan view illustrating fuel injected into the combustion chamber, and a swirl flow generated within the combustion chamber.

A swirl flow generated within the combustion chamber 6 is described with reference to FIGS. 11 and 12. FIG. 11 is a cross-sectional view illustrating a swirl flow FS to be generated within the combustion chamber 6. FIG. 12 is a plan view illustrating the swirl flow FS to be generated within the combustion chamber 6.

As illustrated in FIG. 12, fuel is radially injected from the nozzle head 18N of the injector 18, which is disposed at a radially center portion of the combustion chamber 6 (injected fuel 18E). Specifically, fuel is injected from the injector 18 into the large cavity 52 on the +X side, which is the exhaust port side, and fuel is also injected into the small cavity 51 on the −X side, which is the intake port side.

Note that fuel injection into the small cavity 51 is controlled in such a way that an axis of injection is not directed toward the ignition portion 17A of the ignition plug 17. Specifically, fuel injection into the small cavity 51 is controlled in such a way that an axis of injection passes through both sides of the ignition portion 17A of the ignition plug 17. This enables to suppress plug wetting phenomenon. Furthermore, in the present embodiment, a back portion (base portion 174) of a ground electrode 172 of the ignition plug 17 faces the −X side (radially outwardly of the combustion chamber 6). This also enables to suppress plug wetting phenomenon.

Within the combustion chamber 6, as illustrated by the hollow arrows in FIG. 12, the swirl flow FS is generated in such a way as to circulate an outer periphery portion of the annular-shaped cavity 5C (combination of the small cavity 51 and the large cavity 52). And, an air-fuel mixture of fresh air and fuel is guided to the vicinity of the ignition portion 17A of the ignition plug 17 by the swirl flow FS.

When an imaginary line L52B is drawn on a bottom surface of the annular-shaped cavity 5C, the bottom surface is configured in such a way as to rise upwardly (forwardly on the plane of FIG. 12), as extending from a position P1 to a position P3 via a position P2. Therefore, as illustrated in FIG. 11, an air-fuel mixture guided by the swirl flow FS is gradually raised from the +X side toward the +Z side, as the air-fuel mixture approaches the vicinity of the ignition portion 17A of the ignition plug 17. Thus, within the combustion chamber 6, it is possible to expel residual gas from the vicinity of the ignition portion 17A.

Advantageous Effects

In the combustion chamber 6 of the engine body 1 according to the present embodiment, since the injector 18 is configured to inject fuel in a region including the exhaust port side (+X side), it is possible to atomize the fuel in a short time, even when the engine is in a high load operating range in which the combustion chamber 6 reaches a high temperature state. Therefore, in the present embodiment, it is possible to suppress occurrence of pre-ignition in a high load operating range.

Furthermore, in the combustion chamber 6 of the engine body 1 according to the present embodiment, as described with reference to FIGS. 9, 10A and 10B, a reverse squish flow generation portion, which draws an air-fuel mixture toward the intake port side as the piston 5 is lowered toward the −Z side, is provided within the combustion chamber 6. Therefore, it is possible to cause combustion using oxygen within the entirety of the combustion chamber 6, and to suppress lowering of emission performance.

In the present embodiment, a reverse squish flow generation portion for an air-fuel mixture is formed by a difference in the volume of the combustion chamber between the portion B on the intake port side and the portion A on the exhaust port side. Therefore, as the piston 5 is lowered toward the −Z side in an expansion stroke, the intake port side (particularly, a region below the ignition portion 17A of the ignition plug 17) is brought to a negative pressure state. This enables to draw the air-fuel mixture atomized on the exhaust port side to a region where the ignition portion 17A of the ignition plug 17 is disposed.

In addition, in the combustion chamber 6 of the engine body 1 according to the present embodiment, as described with reference to FIGS. 10A and 10B, the intake side top surface 43 of the ceiling surface 6U in the combustion chamber 6 which is a bottom surface of the cylinder head 4, and the intake-side flat portion 55 in the crown surface 50 of the piston 5 are parallel to each other and in proximity to each other. Therefore, it is possible to generate a reverse squish flow within the combustion chamber 6 by using a negative pressure generated, after the piston 5 passes a TDC, in the vicinity of the ignition portion 17A of the ignition plug 17.

Accordingly, in the present embodiment, it is possible to cause combustion using oxygen within the entirety of the combustion chamber 6, and to suppress lowering of emission performance.

In the present embodiment, the intake-side top surface 43 and the intake-side flat portion 55 are respectively formed of flat surfaces. Therefore, production is easy, as compared with a case where these regions are formed of curved surfaces. Thus, it is possible to provide the reverse squish flow generation portion, while suppressing an increase in production cost.

Furthermore, in the combustion chamber 6 of the engine body 1 according to the present embodiment, the exhaust-side top surface 44 and the exhaust-side flat portion 56 are opposed to each other also on the exhaust port side. As illustrated in FIG. 10A, when the piston 5 is in the vicinity of a TDC, the exhaust-side top surface 44 and the exhaust-side flat portion 56 are made to be proximate to each other. Therefore, it is possible to suppress fuel adhesion on the exhaust port side of a cylinder liner, when fuel is injected. Accordingly, in the present embodiment, it is possible to suppress generation of deposits.

In addition, in the combustion chamber 6 of the engine body 1 according to the present embodiment, an area where the exhaust-side top surface 44 and the exhaust-side flat portion 56 are opposed to each other is made smaller than an area where the intake-side top surface 43 and the intake-side flat portion 55 are opposed to each other in a plan view from the +Z side. Therefore, it is less likely that generation of a reverse squish flow is obstructed, when the piston 5 is lowered toward the −Z side.

Moreover, in the combustion chamber 6 of the engine body 1 according to the present embodiment, as described with reference to FIGS. 11 and 12, a bottom surface of the cavity 5C is formed in such a way that a depth thereof gradually decreases toward the ignition portion 17A of the ignition plug 17. Therefore, when the piston 5 is lifted upwardly toward the +Z side, a swirl component (swirl flow FS) within the cavity 5C is raised toward the ignition portion 17A of the ignition plug 17. This enables to guide an air-fuel mixture of fresh air and fuel toward the vicinity of the ignition portion 17A of the ignition plug 17, and to expel residual gas in the vicinity of the ignition portion 17A.

In addition, in the combustion chamber 6 of the engine body 1 according to the present embodiment, also in a case where a reverse squish flow generated when the piston 5 is lowered toward the −Z side is used, the air-fuel mixture is smoothly guided toward the ignition portion 17A of the ignition plug 17.

Furthermore, in the combustion chamber 6 of the engine body 1 according to the present embodiment, the cavity 5C, which is constituted by combination of the small cavity 51 and the large cavity 52, is formed into an annular shape in a plan view. Therefore, as described with reference to FIG. 12, as the piston 5 approaches a TDC, the air-fuel mixture flows from the exhaust port side of a relatively high temperature toward the intake port side of a relatively low temperature, and is guided to the vicinity of the ignition portion 17A of the ignition plug 17. And, as illustrated in FIGS. 4 and 12, since the ignition portion 17A of the ignition plug 17 is disposed to overlap a part of the cavity 5C in a plan view from the +Z side, it is possible to secure enhanced ignitability.

In addition, in the combustion chamber 6 of the engine body 1 according to the present embodiment, since the ceiling surface of the combustion chamber 6 (combustion chamber ceiling surface 6U) is formed into a pent-roof shape, it is possible to generate a tumble flow within the combustion chamber 6, and to perform homogeneous combustion within the entirety of the combustion chamber 6.

Second Embodiment

Next, a structure of a combustion chamber for a spark ignited engine according to a second embodiment of the present invention is described in detail. Since a basic structure of the second embodiment is the same as the first embodiment, in the following description, constituent elements common to those in the first embodiment are indicated with same reference numbers, and description thereof is omitted or simplified; and differences with respect to the structure of a combustion chamber according to the first embodiment are mainly described in detail.

Figure 13:
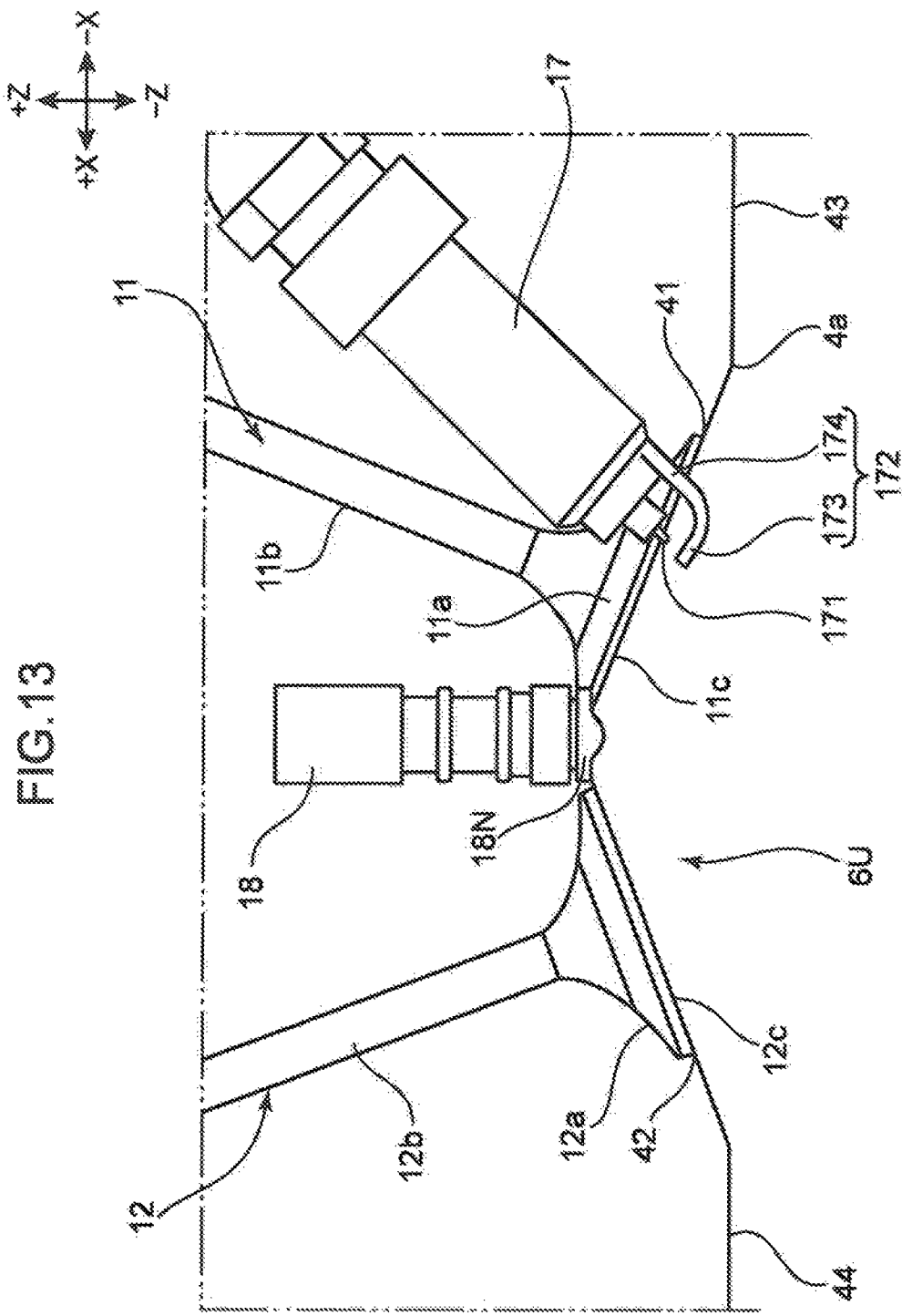
FIG. 13 is a cross-sectional view of essential parts of a cylinder head of an engine to which a structure of a combustion chamber for an engine according to a second embodiment is applied.
Figure 14:
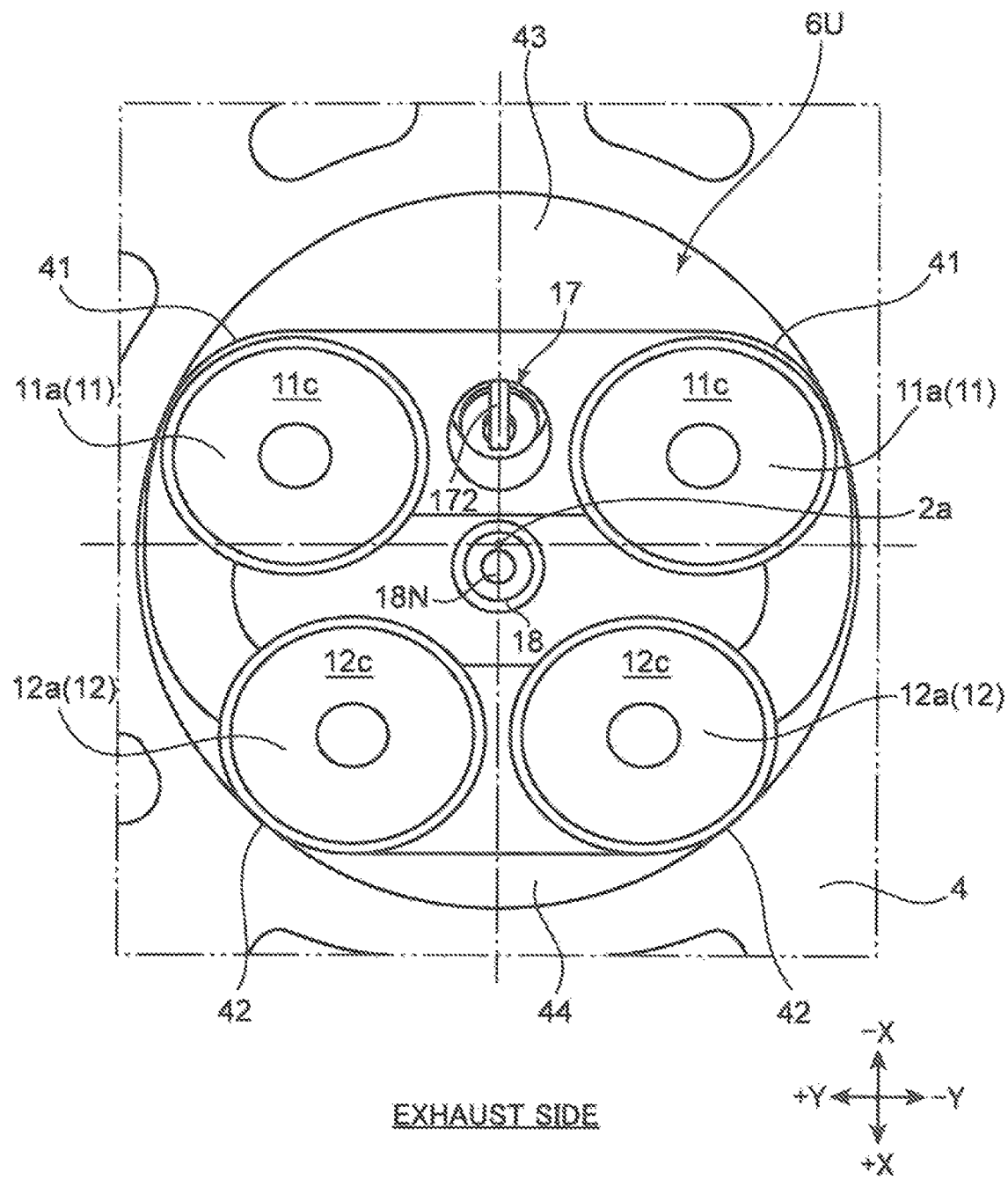
FIG. 14 is a plan view illustrating a ceiling surface of a combustion chamber.

FIG. 13 is a cross-sectional view of essential parts of a cylinder head of an engine to which the structure of a combustion chamber for the engine according to the second embodiment is applied. FIG. 14 is a plan view of a combustion chamber ceiling surface.

A combustion chamber ceiling surface 6U has a pent-roof shape, similarly to the first embodiment. Whereas the combustion chamber ceiling surface 6U in the first embodiment has a shallow pent-roof shape (a small slope) as illustrated in FIG. 2, the combustion chamber ceiling surface 6U in the second embodiment has a deep pent-roof shape (a large slope). In other words, a combustion chamber 6 in the second embodiment has a structure in which a compression ratio is set small by increasing a volume of the combustion chamber 6, as compared with the first embodiment.

In the combustion chamber ceiling surface 6U of a deep pent-roof shape as described above, in order to secure, while disposing an injector 18 between two intake-side opening portions 41, a required opening area of each of the intake-side opening portions 41, it is necessary to dispose the two intake-side opening portions 41 at a position close to a center of a cylinder 2 in the X-direction. In view of the above, in the second embodiment, as illustrated in FIG. 14, a part of each of the two intake-side opening portions 41 is disposed to be located on the exhaust port side with respect to a center 2a of the cylinder 2.

Accordingly, the injector 18 (nozzle head 18N) is also disposed to be offset on the exhaust port side with respect to the center 2a of the cylinder 2. An offset amount of the injector 18 is set to such a position that fuel to be injected from the nozzle head 18N when the fuel is injected mainly in the mode II, specifically, in a middle stage of an intake stroke is easily spread, while being carried by a main stream of intake air to be introduced to the combustion chamber 6 through the intake-side opening portion 41. In the present example, the injector 18 is offset on the exhaust port side with respect to the center 2a of the cylinder 2 by about 2 mm.

FIG. 27 is a cross-sectional view illustrating a relationship between a flow of intake air in a middle stage of an intake stroke, and the injector 18. As illustrated in FIG. 27, a main stream Ms of intake air to be introduced to the combustion chamber 6 through an intake port 9 generates a tumble flow, while being introduced to the combustion chamber 6 along an upper wall surface of the intake port 9. In this state, when the center of the injector 18 is aligned with the center 2a of the cylinder 2, a part of fuel is injected from the nozzle head 18N at a position lower than the main stream Ms of intake air, and may not be carried by the main stream Ms of intake air. On the other hand, in a configuration in which the injector 18 is offset on the exhaust port side with respect to the center 2a of the cylinder 2, fuel is injected from the nozzle head 18N at a position above or in the vicinity of the main stream Ms of intake air. Hence, the fuel is easily spread while being carried by the main stream Ms of intake air.

In the present embodiment, the center of the injector 18 (nozzle head 18N) is offset on the exhaust port side with respect to the center 2a of the cylinder 2 by about 2 mm. The offset amount in this case may be set to such an amount that fuel to be injected from the injector 18 is spread in a satisfactory manner, while being carried by the main stream Ms of intake air. For example, preferably, the center of the injector 18 (nozzle head 18N) may be offset on the exhaust port side with respect to the center 2a of the cylinder 2 in a range of 2 to 5% of a diameter (bore diameter) of the cylinder 2.

A configuration of a crown surface 50 of a piston 5 in the second embodiment is similar to the first embodiment in a point that the crown surface 50 includes a cavity 5C, an intake-side flat portion 55, an exhaust-side flat portion 56, and a pair of lateral upper surfaces 57. However, a specific structure is different from the first embodiment in the following points.

Figure 15:
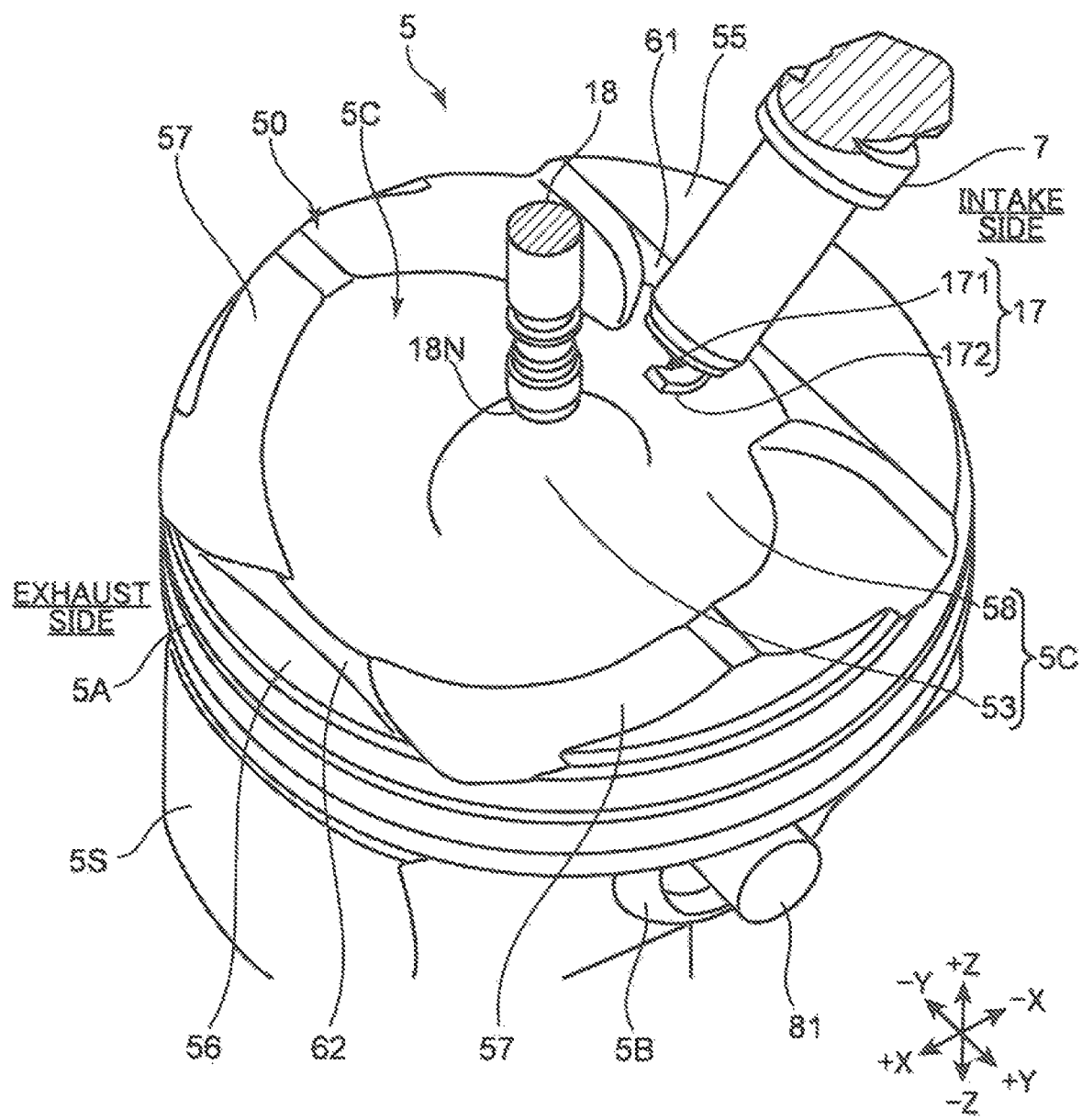
FIG. 15 is a perspective view illustrating a layout of an ignition plug and an injector with respect to a piston.
Figure 16:
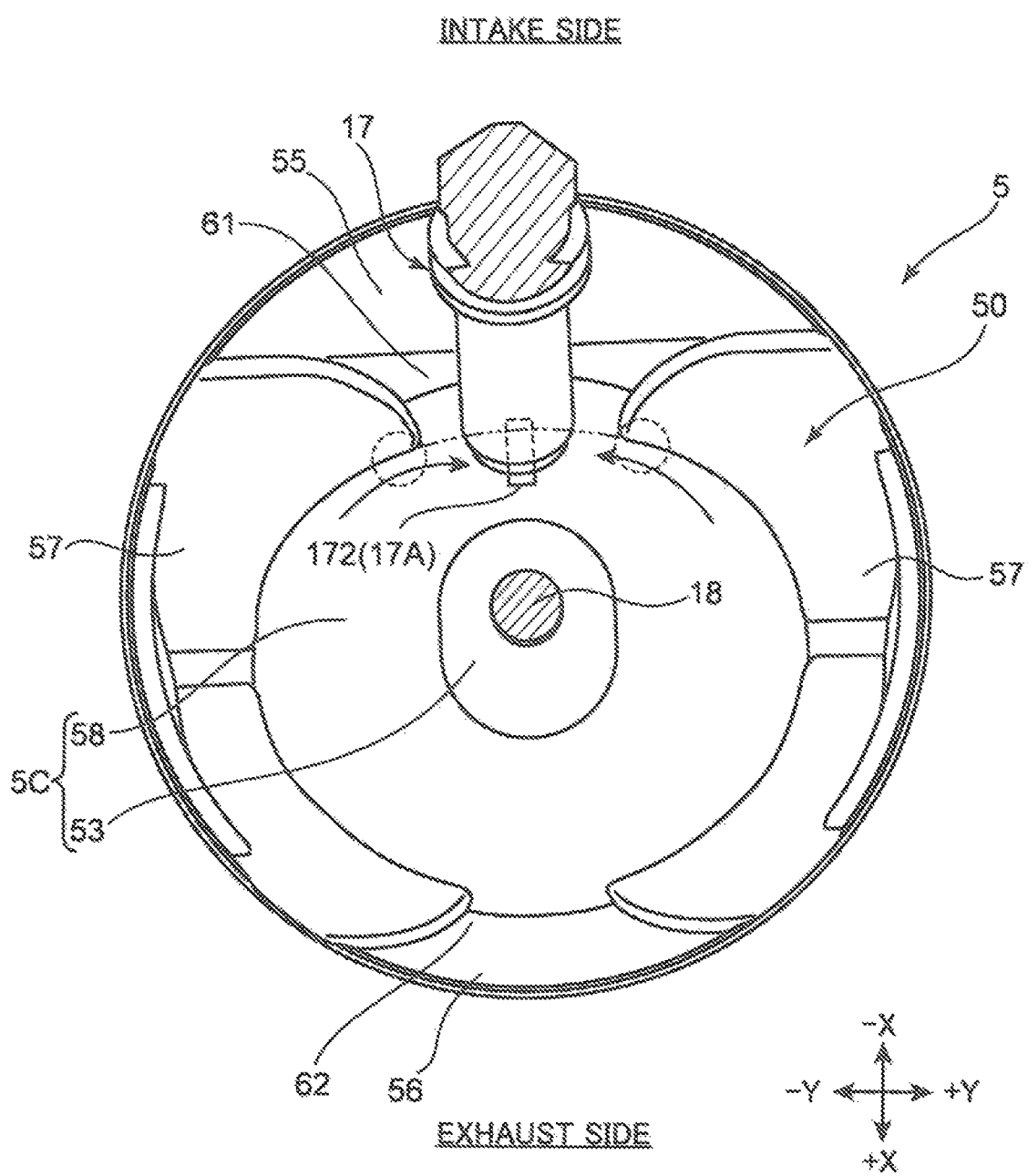
FIG. 16 is a plan view illustrating a layout of the ignition plug and the injector with respect to the piston.
Figure 17:
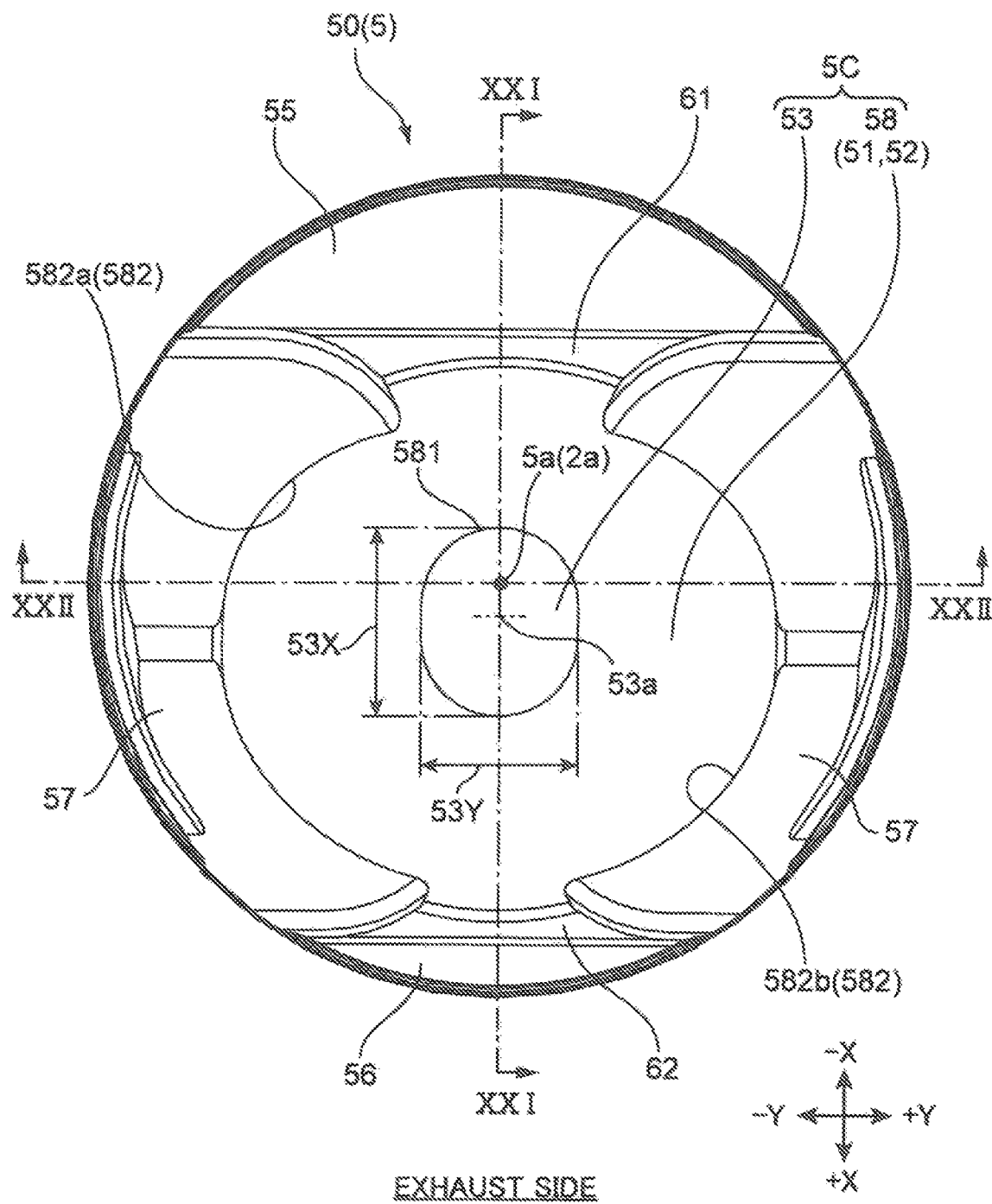
FIG. 17 is a plan view of a crown surface of the piston.
Figure 18:
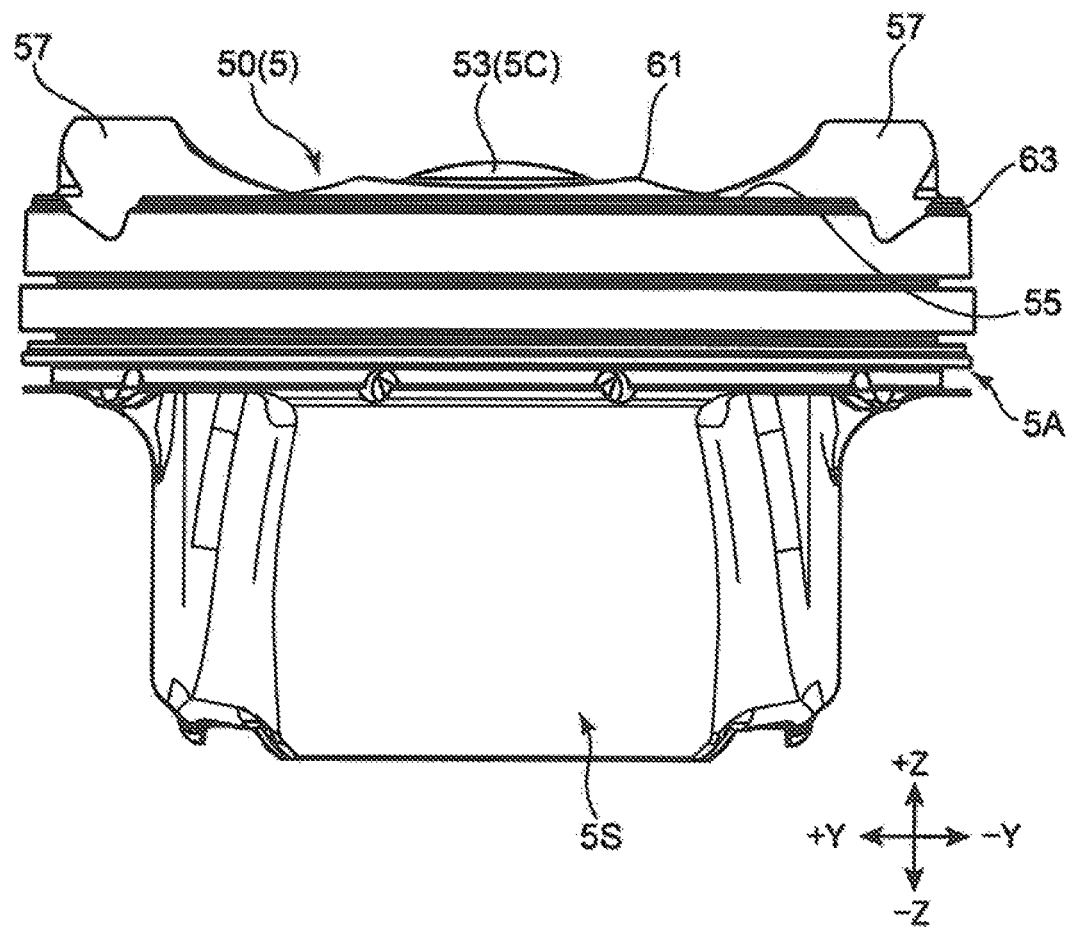
FIG. 18 is a front view of the piston (diagram viewed from an intake port side).
Figure 19:
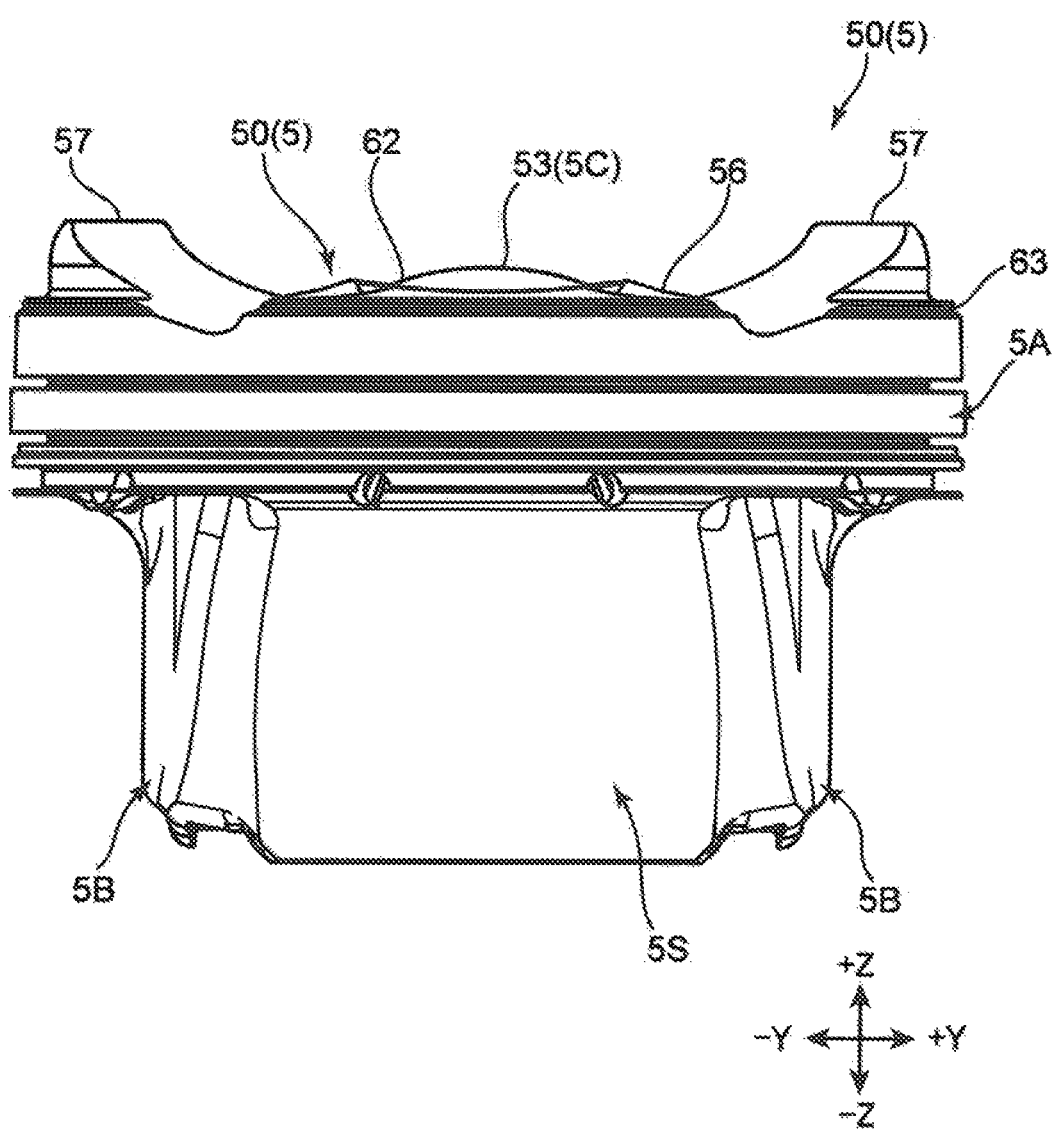
FIG. 19 is a rear view of the piston (diagram viewed from an exhaust port side).
Figure 20:
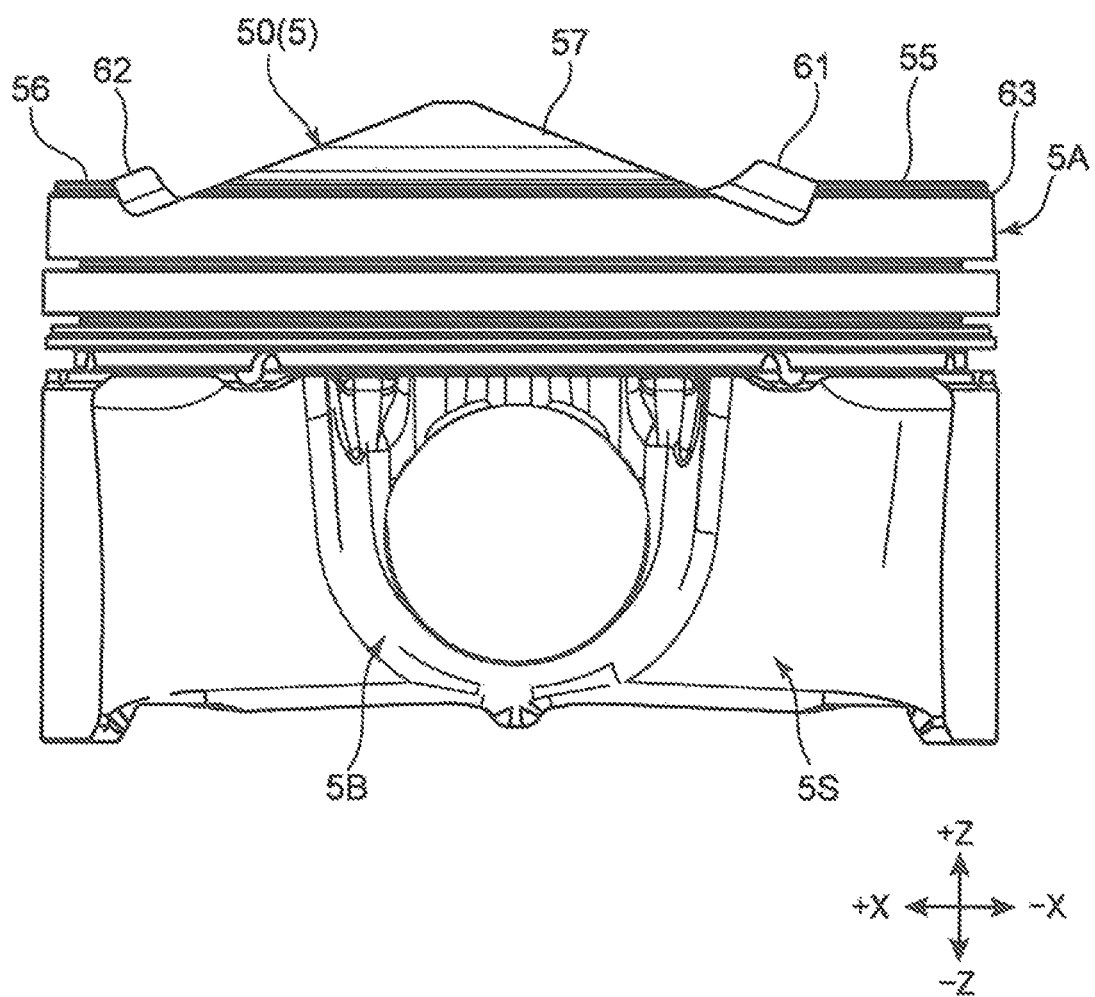
FIG. 20 is a side view of the piston.
Figure 21:
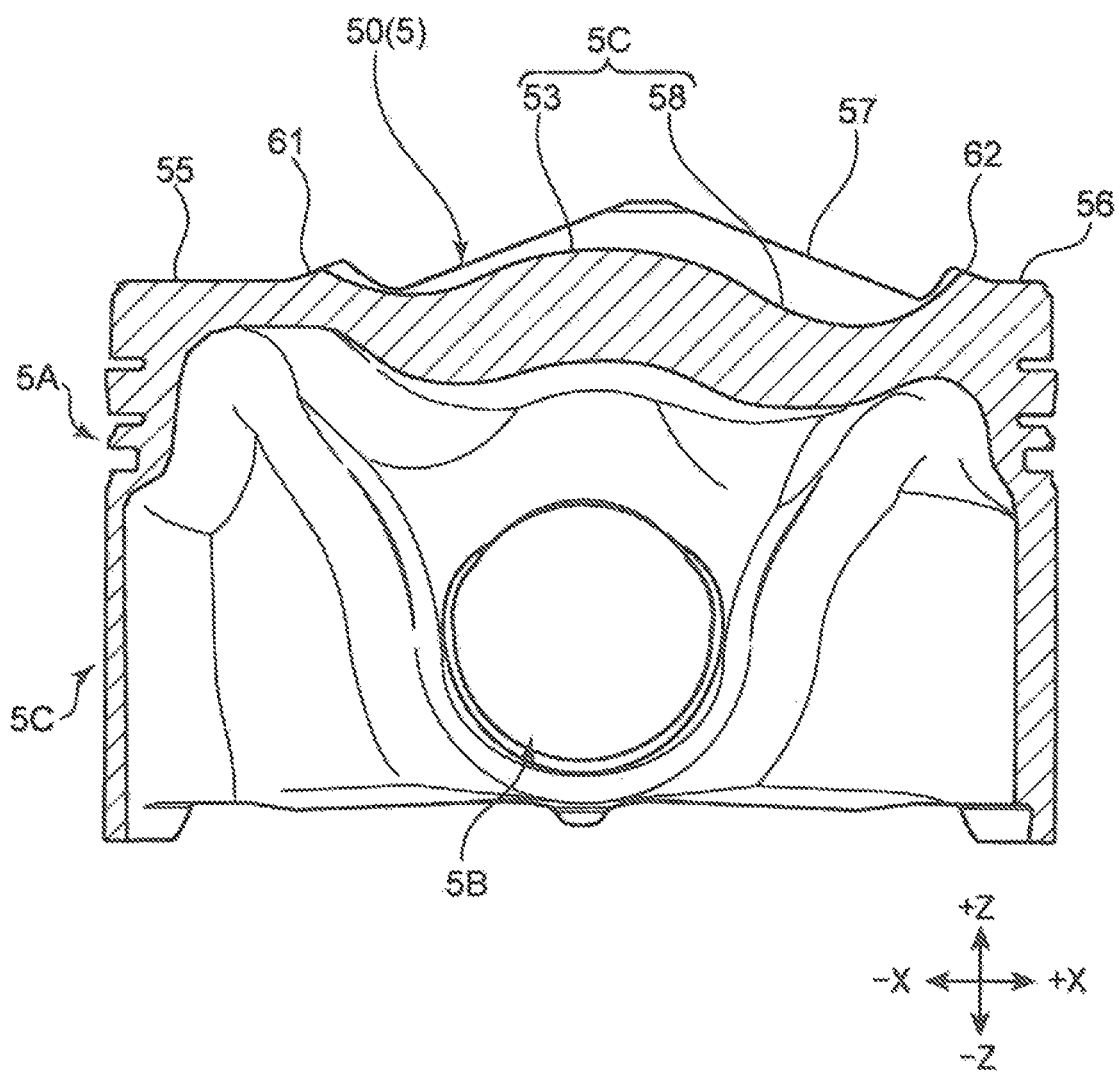
FIG. 21 is a cross-sectional view taken along the line XXI-XXI in FIG. 17.
Figure 22:
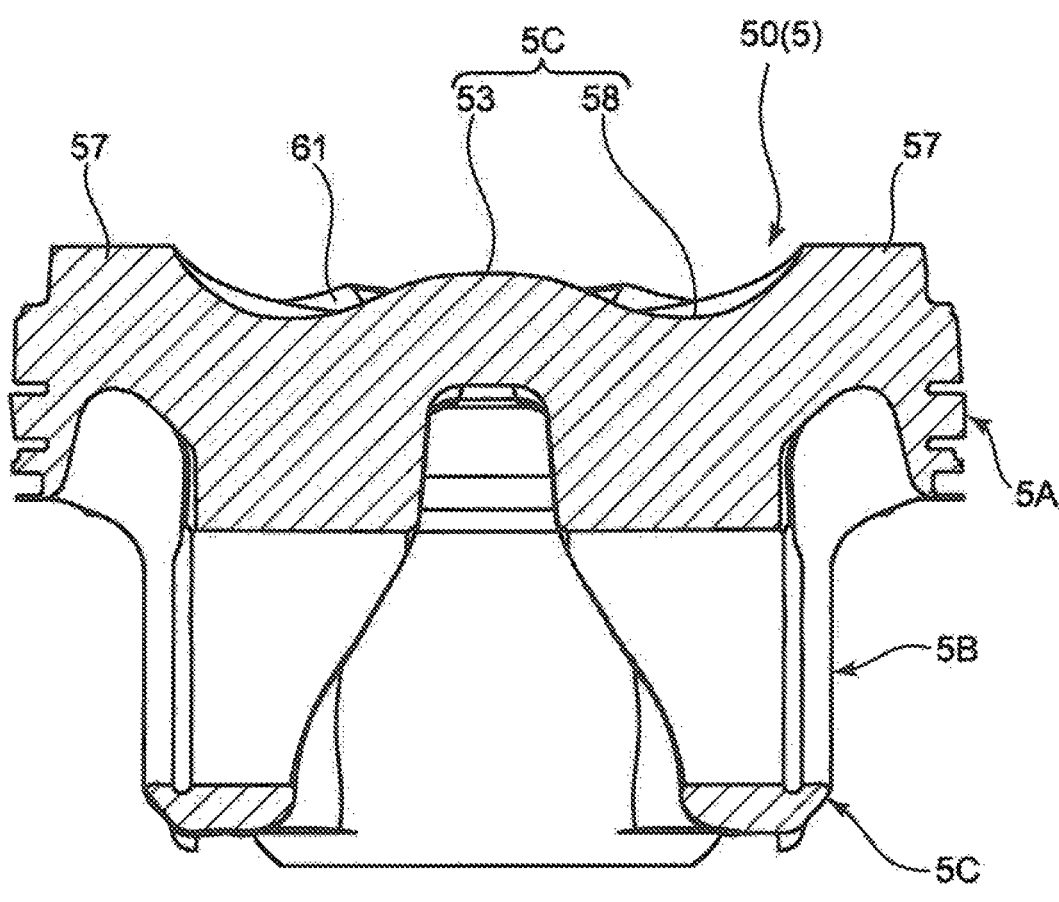
FIG. 22 is a cross-sectional view taken along the line XXII-XXII in FIG. 17.
Figure 23:
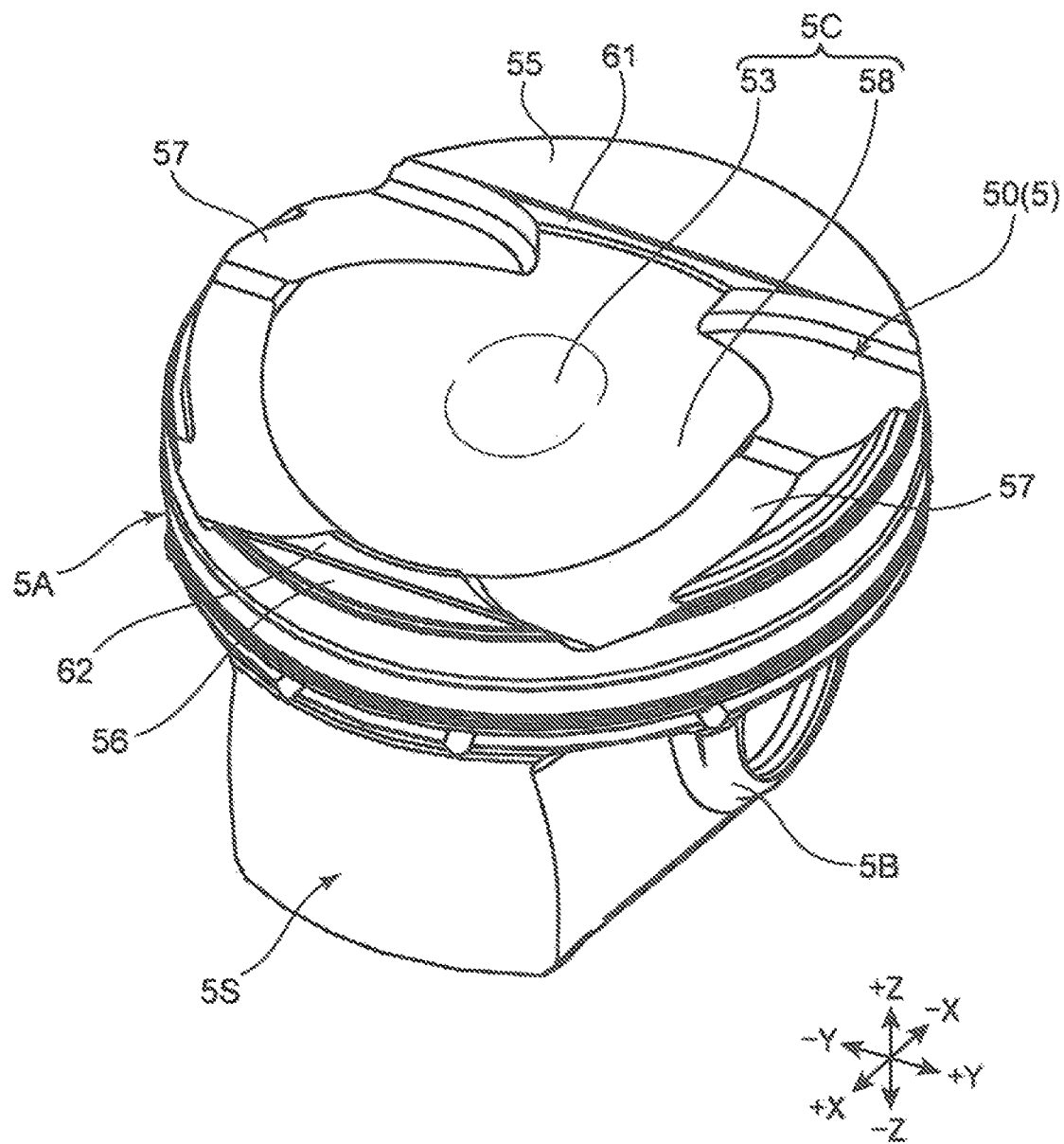
FIG. 23 is a perspective view of the piston (perspective view from the exhaust port side).
Figure 24:
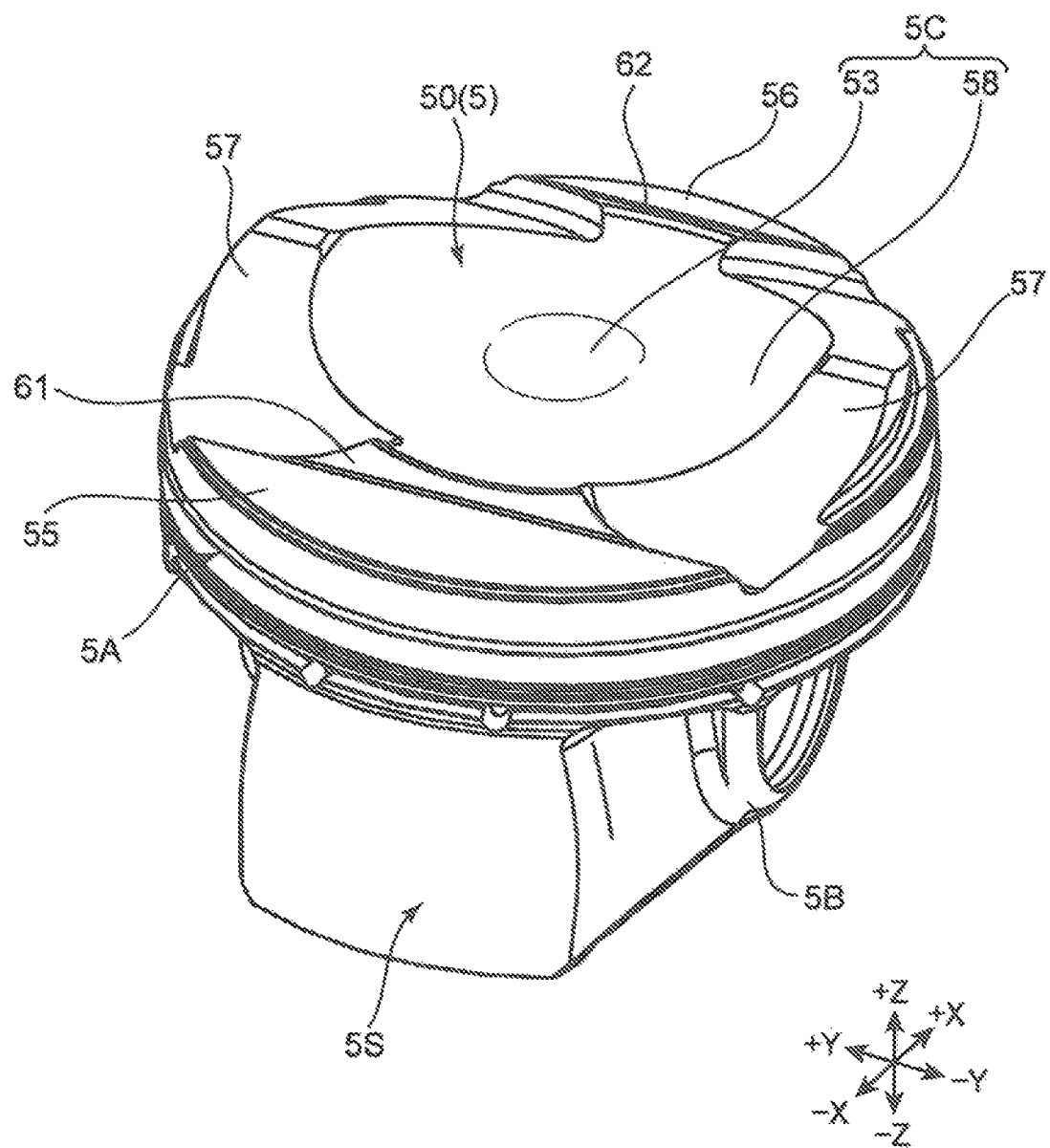
FIG. 24 is a perspective view of the piston (perspective view from the intake port side).

FIG. 15 is a perspective view illustrating a layout relationship of an ignition plug 17 and the injector 18 with respect to the piston 5. FIG. 16 is a plan view illustrating the layout relationship. FIG. 17 is a plan view of the crown surface 50 of the piston 5. FIGS. 18 to 20 are respectively a front view (diagram viewed from the intake port side), a rear view (diagram viewed from the exhaust port side), and a side view of the piston 5. FIGS. 21 and 22 are respectively cross-sectional views taken along the line XXI-XXI and the line XXII-XXII in FIG. 17. Further, FIG. 23 is a perspective view of the piston 5 viewed from the exhaust side, and FIG. 24 is a perspective view of the piston 5 viewed from the intake port side.

The cavity 5C in the second embodiment has a smoothly continued shape, unlike a configuration in which a small cavity 51 and a large cavity 52 are partitioned by a ridge line 54 (in other words, without via a ridge line 54). That is, as illustrated in FIG. 17, the cavity 5C includes a projection portion 53, and one annular cavity (hereinafter, referred to as an annular cavity 58), which is smoothly continued in such a way as to surround the projection portion 53. Although the annular cavity 58 is not partitioned by a ridge line 54, similarly to the first embodiment, a bottom surface of the annular cavity 58 (cavity 5C) is gradually raised upwardly (toward the +Z side), as extending from the exhaust side toward a position immediately below an ignition portion 17A of the ignition plug 17.

As illustrated in FIGS. 17 to 20, regarding the crown surface 50, an intake-side slope portion 61 is provided between the intake-side flat portion 55 and the annular cavity 58, and between the paired lateral upper surfaces 57; and an exhaust-side slope portion 62 is provided between the exhaust-side flat portion 56 and the annular cavity 58, and between the paired lateral upper surfaces 57.

The intake-side slope portion 61 is a flat slope inclined obliquely upwardly from a distal end of the intake-side flat portion 55 toward the exhaust port side. The exhaust-side slope portion 62 is a flat slope inclined obliquely upwardly from a distal end of the exhaust-side flat portion 56 toward the intake side. As illustrated in FIG. 25, each of the slope portions 61 and 62 is a surface, which is in proximity to and opposed to a pent-roof portion of the combustion chamber ceiling surface 6U, and extends substantially in parallel to the pent-roof portion, when the piston 5 is in a top dead center position. Since the combustion chamber ceiling surface 6U has a deep pent-roof shape, a portion of the crown surface 50 associated with each of the lateral upper surfaces 57 is projected into a frustum shape toward the combustion chamber ceiling surface 6U. In the following description, the frustum-shaped projecting portion may be referred to as a lateral upper surface portion 57.

The annular cavity 58 is formed off-center on the exhaust port side in the crown surface 50. As illustrated in FIG. 17, the projection portion 53 has a size 53X in the X-direction larger than a size 53Y in the Y-direction, when viewed in the cylinder axis direction, in other words, has an oval shape (elliptical shape) being long in the X-direction and thin. A center 53a of the projection portion 53 is offset on the exhaust port side with respect to a center 5a of the crown surface 50 (center 2a of the cylinder 2) in association with the injector 18. Thus, the center of the projection portion 53 is located at a position immediately below the injector 18 (nozzle head 18N).

The annular cavity 58 includes an inner rim 581 and an outer rim 582, which are rims defining the annular cavity 58. The inner rim 581 serves as a borderline with respect to the projection portion 53, and the outer rim 582 serves as a borderline with respect to the intake-side slope portion 61, the exhaust-side slope portion 62, and the lateral upper surfaces 57.

Regarding the outer rim 582, a portion (exhaust-side outer rim 582b), which is on the exhaust side with respect to the center 5a (line XXII-XXII in FIG. 17) of the crown surface 50 and serves as a borderline with respect to the lateral upper surface 57, has an arc shape along a substantially true circle with respect to the center 5a as a center. On the other hand, a portion (intake-side outer rim 582a), which is on the intake port side with respect to the center 5a of the crown surface 50 and serves as a borderline with respect to the lateral upper surface 57, has an arc shape along an ellipse with respect to the center 5a as a center, or an oblong circle with a long length in the Y-direction. As a result of the annular cavity 58 and the projection portion 53 being formed in this way, the annular cavity 58 is off-center on the exhaust port side in the crown surface 50.

Figure 26:
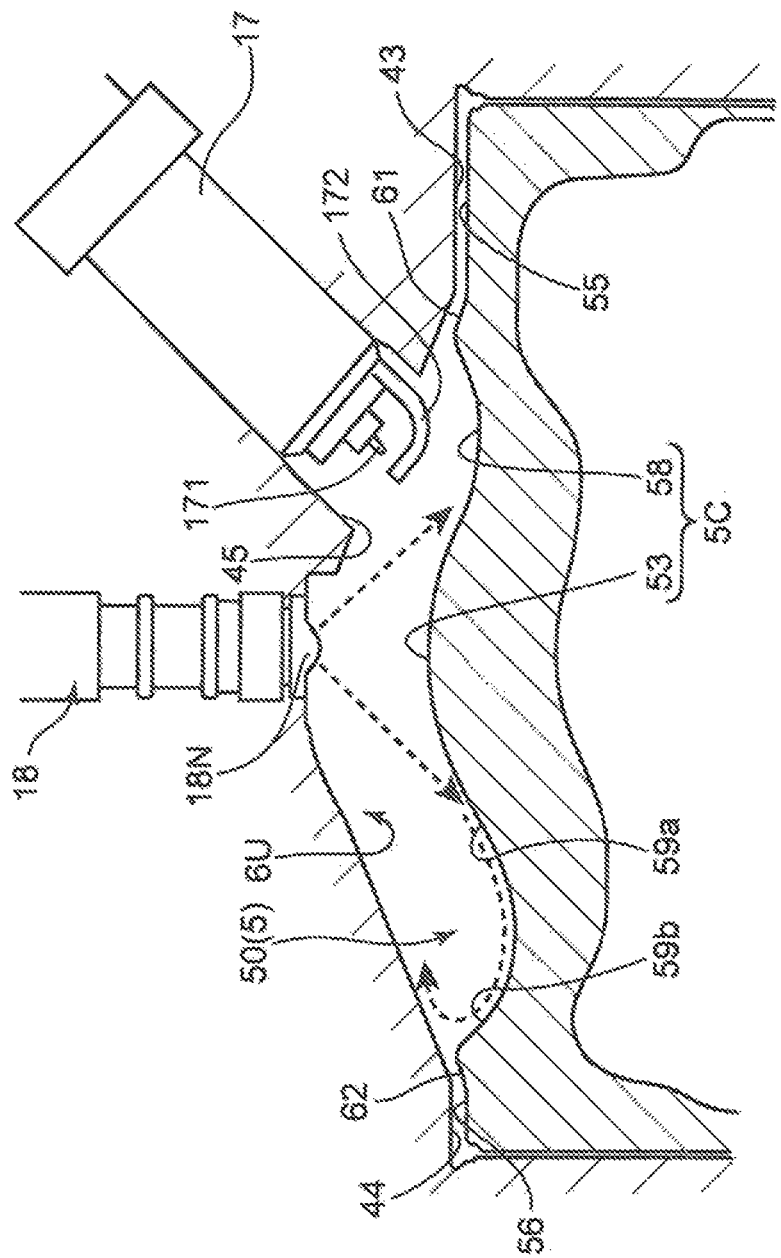
FIG. 26 is a cross-sectional view illustrating the combustion chamber in a compression stroke.

In the second embodiment, as illustrated in FIGS. 13 and 15, the ignition plug 17 is disposed on the combustion chamber ceiling surface 6U in a direction opposite to the first embodiment. In concrete terms, the ignition plug 17 is disposed, within a plug recess portion 45 formed in the combustion chamber ceiling surface 6U, in such a way that a distal end of a ground electrode 172, specifically, a distal end of an opposing portion 173 on a side opposite to a base portion faces radially inwardly of the combustion chamber 6 when viewed in the cylinder axis direction. In the second embodiment in which the combustion chamber ceiling surface 6U has a deep pent-roof shape, and the intake-side slope portion 61 is provided on the crown surface 50, with the ignition plug 17 being disposed in this way, the scavenging effect around the ignition portion 17A in a compression stroke is enhanced. That is, in the second embodiment in which the intake-side slope portion 61 associated with a pent-roof portion of the combustion chamber ceiling surface 6U is provided on the crown surface 50 of the piston 5, as intake air or an air-fuel mixture is compressed in a portion between the intake-side top surface 43 of the combustion chamber ceiling surface 6U and the intake-side flat portion 55 of the piston 5 in a compression stroke, a squish flow flowing toward the combustion chamber ceiling surface 6U along the intake-side slope portion 61 is generated, as illustrated by the arrow in FIG. 26. At this occasion, with the ignition plug 17 being disposed in such a way that a distal end of the ground electrode 172 faces radially inwardly of the combustion chamber 6, residual gas within the plug recess portion 45 is easily expelled by the squish flow. In other words, the scavenging effect around the ignition portion 17A is enhanced.

The cavity shape of the annular cavity 58 is formed into a shape capable of smoothly raising fuel injected from the injector 18 along the combustion chamber ceiling surface 6U, when the piston 5 is in a compression top dead center position or in the vicinity thereof in the mode I. Specifically, as illustrated in FIG. 25, the annular cavity 58 includes an entrance portion 59a, which is located on an inner peripheral side of the annular cavity 58 and is configured to guide fuel injected from the injector 18 outwardly along the projection portion 53, when the piston 5 is in a compression top dead center position or in the vicinity thereof; and a raising portion 59b, which is located on an outer peripheral of the entrance portion 59a and raises the fuel guided along the entrance portion 59a toward the combustion chamber ceiling surface 6U. The entrance portion 59a has an arc shape in cross section, which is smoothly continued to the projection portion 53. The raising portion 59b has an arc shape in cross section, which has a curvature radius smaller than a curvature radius of the entrance portion 59a. On a portion of the annular cavity 58 associated with the intake-side slope portion 61 and the exhaust-side slope portion 62, the raising portion 59b is raised high by a height corresponding to an area where the slope portions 61 and 62 are formed. Thus, as illustrated by the broken-line arrows in FIG. 25, fuel injected from the nozzle head 18N is advantageously raised along a pent-roof portion of the combustion chamber ceiling surface 6U, and fuel atomization is promoted.

Portions (portions surrounded by the broken-line circles in FIG. 16/corresponding to a plug pointing portion of the present invention) associated with distal ends of the paired lateral upper surfaces 57 on the intake-side outer rim 582a of the annular cavity 58 are curved and directed to the ignition portion 17A of the ignition plug 17 when viewed in the cylinder axis direction. Specifically, when it is assumed that the intake-side outer rim 582a extends from portions associated with distal ends of the paired lateral upper surfaces 57, portions associated with the distal ends of the paired lateral upper surfaces 57 on the intake-side outer rim 582a are formed in such a way that the intake-side outer rim 582a passes through the ignition portion 17A. Thus, as illustrated by the arrows in FIG. 16, an air-fuel mixture flowing from the exhaust port side toward the intake port side along the annular cavity 58 is guided toward the ignition portion 17A.

In the piston 5 in the second embodiment, as illustrated in FIGS. 18 to 20, a step portion 63 is formed on an outer periphery of an upper end of a piston head 5A of the piston 5. The step portion 63 forms a gap, through which unburnt gas escapes, between an outer peripheral surface of the upper end of the piston head 5A and an inner peripheral surface of the cylinder 2 in an expansion stroke. Thus, occurrence of knocking phenomenon is suppressed.

The structure of a combustion chamber according to the second embodiment is as described above. The structure of a combustion chamber according to the second embodiment is configured in such a way that the combustion chamber ceiling surface 6U has a deep pent-roof shape in order to reduce a compression ratio by increasing a volume of the combustion chamber 6. However, a basic structure of the second embodiment is the same as the first embodiment. Therefore, the structure of a combustion chamber according to the second embodiment is also able to provide operations and advantageous effects substantially equivalent to those of the structure of a combustion chamber according to the first embodiment. Specifically, when the piston 5 is lowered toward the −Z side in an expansion stroke, a reverse squish flow, which draws an air-fuel mixture toward the intake port side, is generated, and it is possible to cause combustion using oxygen within the entirety of the combustion chamber 6 and to suppress lowering of emission performance. In addition, when the piston 5 is lifted toward the +Z side in a compression stroke, a swirl component (swirl flow FS) within the annular cavity 58 is raised toward the ignition portion 17A of the ignition plug 17. Thus, it is possible to expel residual gas in the vicinity of the ignition portion 17A of the ignition plug 17, and to improve ignition stability.

Third Embodiment

Next, a structure of a combustion chamber for a spark ignited engine according to a third embodiment of the present invention is described in detail. Since a basic structure of the third embodiment is the same as the second embodiment, in the following description, differences with respect to the structure of a combustion chamber according to the second embodiment are mainly described in detail.

Figure 28:
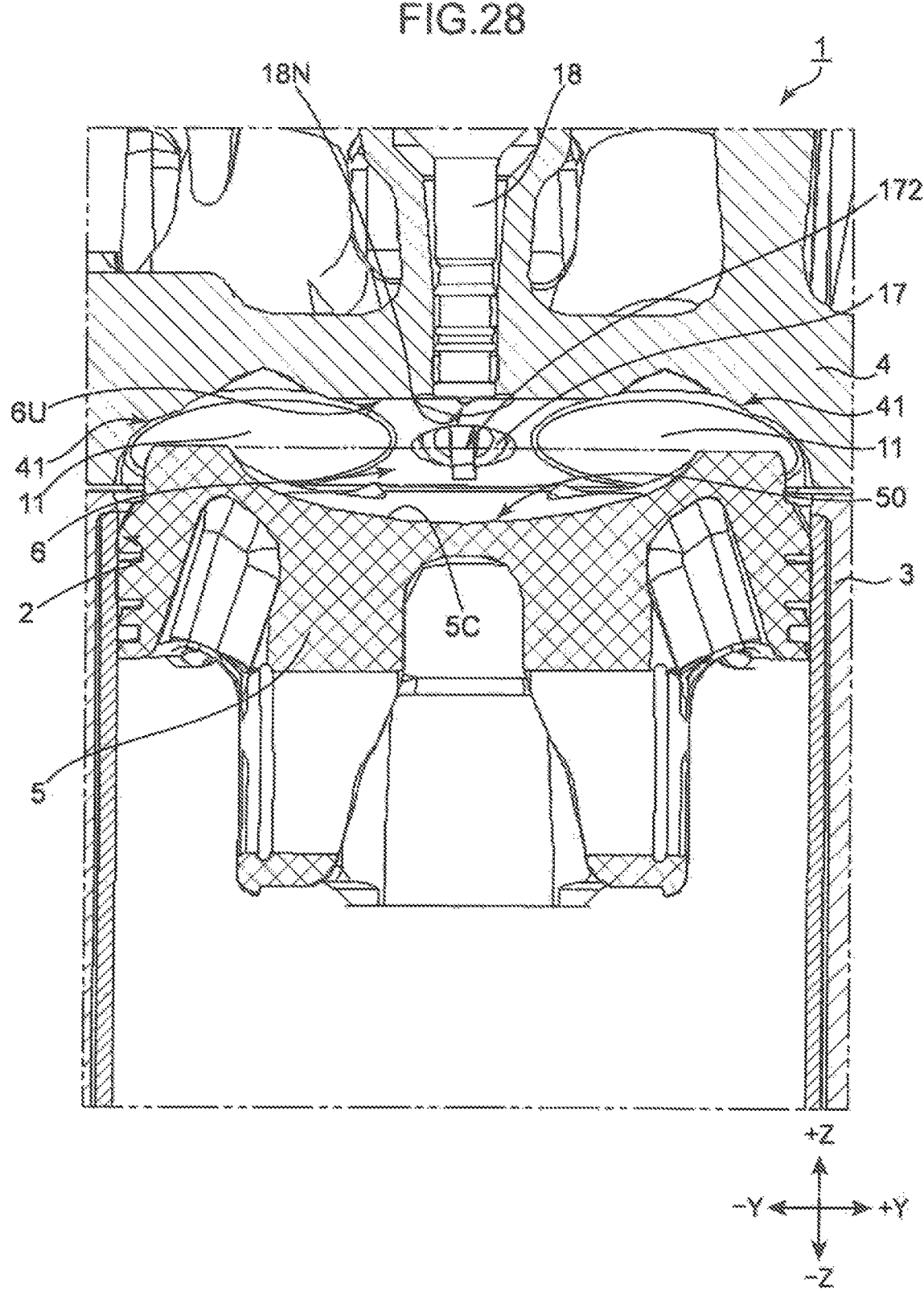
FIG. 28 is a cross-sectional view of essential parts of an engine to which a structure of a combustion chamber for an engine according to a third embodiment is applied.
Figure 30:
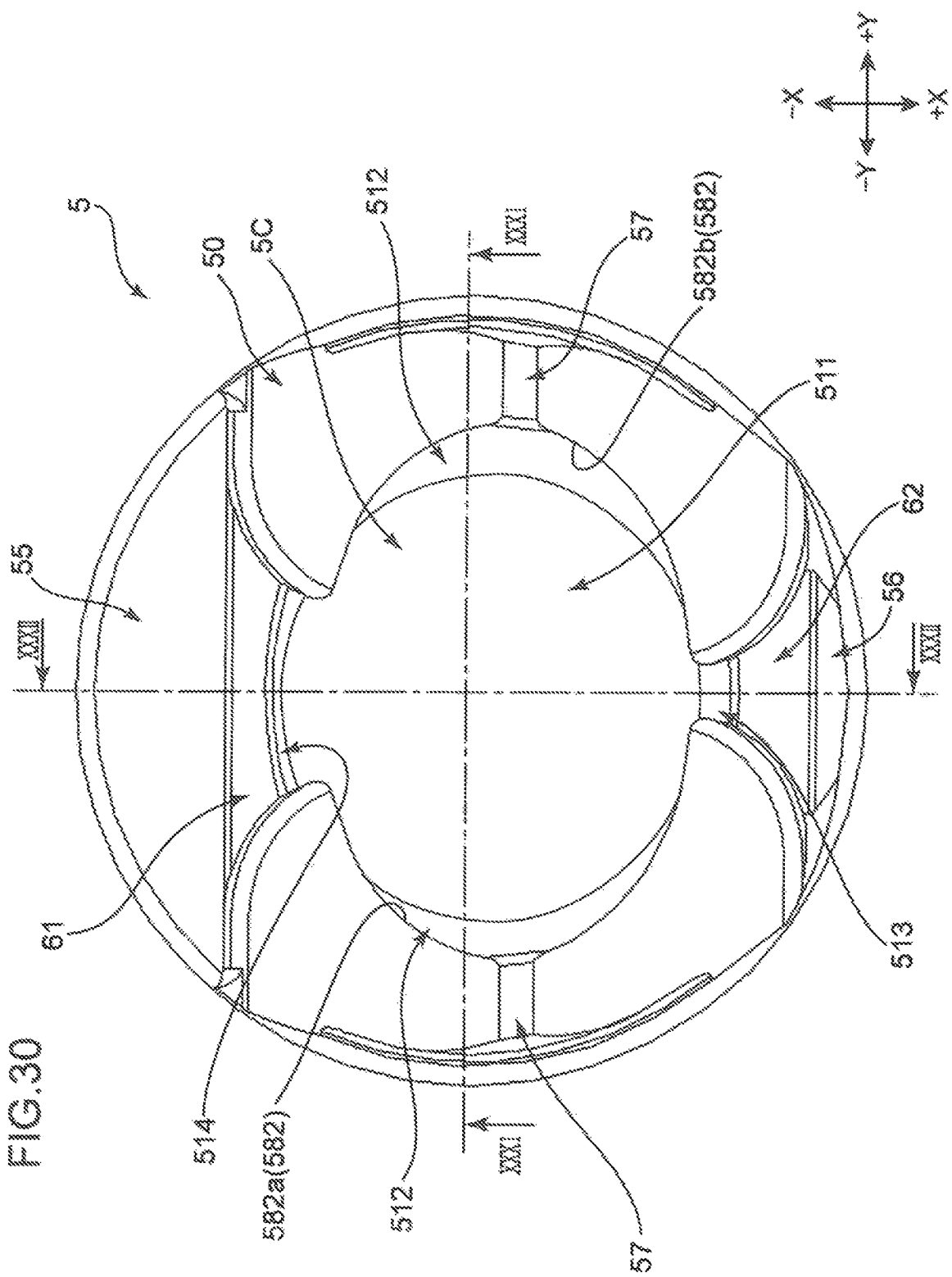
FIG. 30 is a plan view of a crown surface of the piston.
Figure 31:
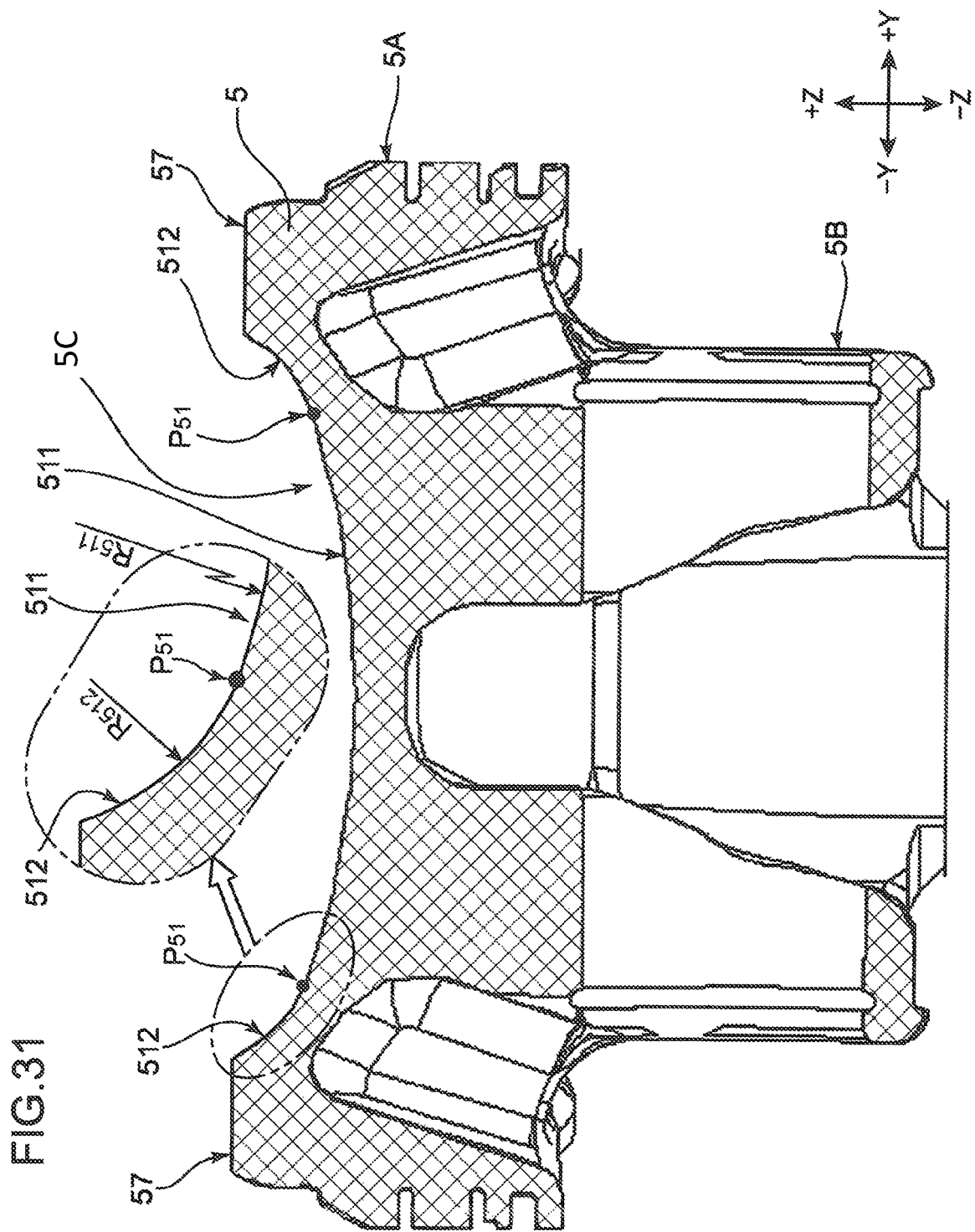
FIG. 31 is a cross-sectional view taken along the line XXXI-XXXI in FIG. 30.
Figure 32:
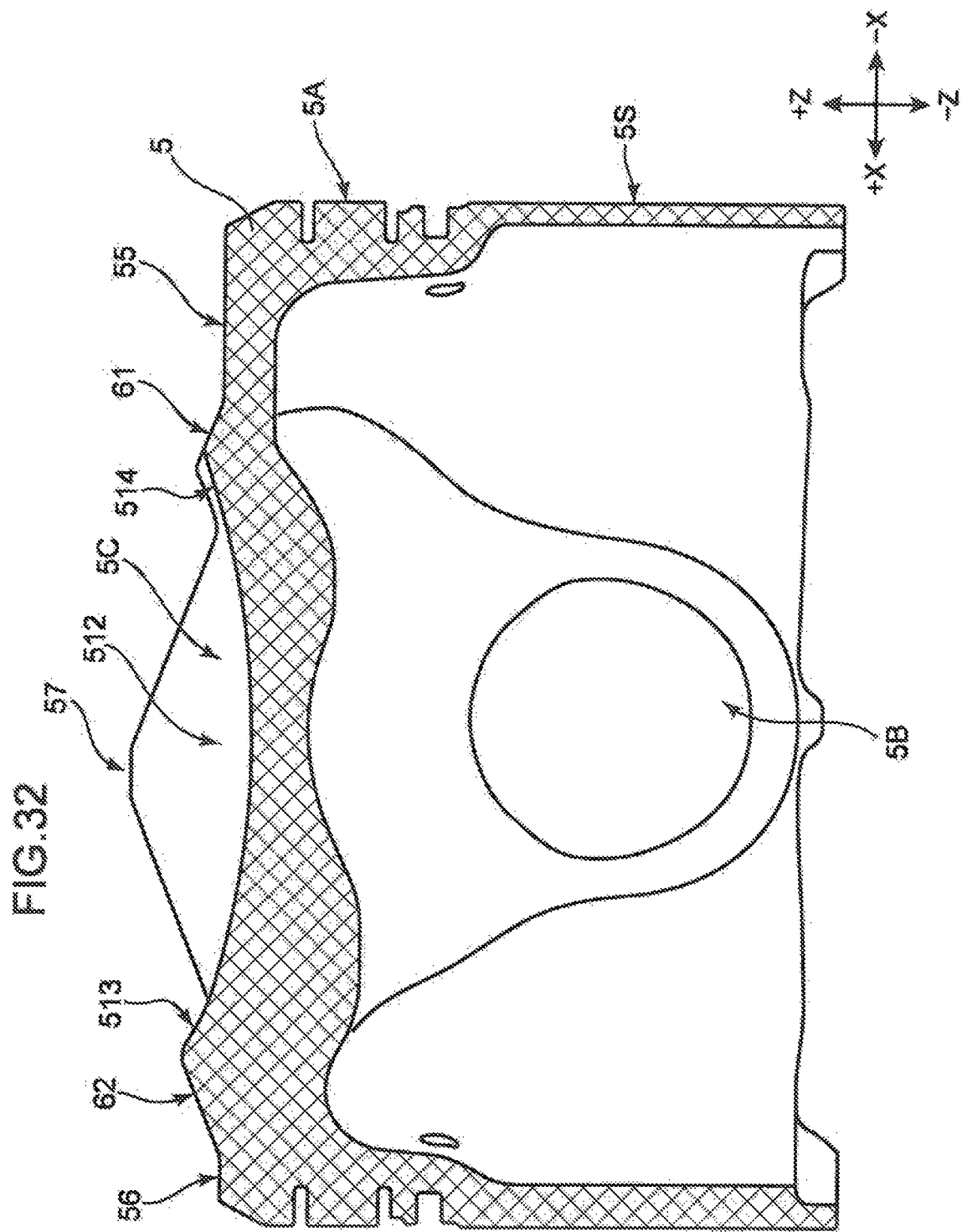
FIG. 32 is a cross-sectional view taken along the line XXXII-XXXII in FIG. 30.

FIG. 28 is a cross-sectional view of essential parts of an engine to which the structure of a combustion chamber for the engine according to the third embodiment is applied. In addition, FIGS. 29 to 32 illustrate a piston 5. Specifically, FIG. 29 is a perspective view, FIG. 30 is a plan view, and FIGS. 31 and 32 are cross-sectional views, each of which illustrates the piston 5.

A configuration of a crown surface 50 of the piston 5 in the third embodiment is similar to the second embodiment in a point that the crown surface 50 includes a cavity 5C (a cavity having a substantially circular outer rim when viewed in the cylinder axis direction), an intake-side flat portion 55, an exhaust-side flat portion 56, a pair of lateral upper surfaces 57 (lateral upper surface portions 57), an intake-side slope portion 61, and an exhaust-side slope portion 62. However, a specific structure of the third embodiment is different from the second embodiment in the following points.

In the second embodiment, the cavity 5C including the projection portion 53 and the annular cavity 58 surrounding the projection portion 53 is provided in the crown surface 50. However, in the third embodiment, one cup-shaped cavity 5C recessed downwardly (toward the −Z side) is provided in the crown surface 50.

The cavity 5C includes lateral upright portions 512, an exhaust-side upright portion 513, an intake-side upright portion 514, and a bottom surface portion 511. Among these, the lateral upright portions 512, the exhaust-side upright portion 513, and the intake-side upright portion 514 are provided on a rim portion of the cavity 5C in a plan view of the crown surface 50 of the piston 5. On the other hand, the bottom surface portion 511 is provided in an inner region of the cavity 5C.

As illustrated in FIG. 31, in the cavity 5C, the bottom surface portion 511 is formed of a curved surface having a curvature radius R511, and the lateral upright portion 512 is formed of a curved surface having a curvature radius R512. The curvature radius R512 is smaller than the curvature radius R511. In other words, the lateral upright portion 512 is formed of a curved surface raised in the Z-direction with respect to the bottom surface portion 511. The curved surface of the lateral upright portion 512 and the curved surface of the bottom surface portion 511 come into contact with each other at a boundary portion P51.

As illustrated in FIG. 30, the lateral upright portion 512 is a lateral surface of the cavity 5C associated with the lateral upper surface portion 57. As can be seen from FIGS. 30 and 28, the lateral upright portions 512 are raised up to such a position as to interpose an ignition portion 17A of an ignition plug 17 therebetween, when the piston 5 is in the compression top dead center (TDC) (see the two-dotted chain line in FIG. 28). Thus, when in-cylinder flow within a combustion chamber 6 is gathered within the cavity 5C, as the piston 5 is lifted in a compression stroke, the lateral upright portions 512 serve as a guide portion which guides a flow of air-fuel mixture toward the ignition portion 17A of the ignition plug 17. Although the ignition plug 17 is not illustrated in detail, in the third embodiment, similarly to the first embodiment, the ignition plug 17 is disposed in such a way that a distal end of a ground electrode 172, specifically, a distal end of an opposing portion 173 on a side opposite to a base portion faces radially outwardly of the combustion chamber 6, when viewed in the cylinder axis direction.

Similarly to the lateral upright portions 512, each of the exhaust-side upright portion 513 and the intake-side upright portion 514 is also formed of a curved surface raised in the Z-direction with respect to the bottom surface portion 511, and comes into contact with the bottom surface portion 511 at a boundary portion. And, as illustrated in FIG. 30, the exhaust-side upright portion 513 is continued to the exhaust-side slope portion 62 via a ridge line, and the intake-side upright portion 514 is continued to the intake-side slope portion 61 via a ridge line.

An engine body 1 according to the third embodiment is operated according to a combustion injection timing and an ignition timing in the above-described mode II, and in the mode III illustrated in FIG. 33. The mode II is employed in SI combustion, and the mode III is mainly employed in SICI combustion. Therefore, in a high speed range of the engine, the mode II is mainly selected, and in a high-load low-speed range and in a high-load medium-speed range, the mode III is mainly selected.

Fuel injection periods PF3 and PF4 in the mode III are respectively a middle stage of an intake stroke and a later stage of a compression stroke, and the ignition timing is an initial stage of an expansion stroke. Specifically, a period from a timing T31 until a timing T32 is set as the fuel injection period PF3 as a former part, a crank angle CA4 being interposed between the timings T31 and T32, the crank angle CA4 corresponding to a position at which the piston 5 is lowered about a half in the stroke from the TDC in an exhaust stroke. A period from a timing T33 in a later stage of a compression stroke until a timing T34 immediately before the TDC in the compression stroke is set as the fuel injection period PF4 as a latter part. In addition, the ignition timing is a timing T35 associated with a predetermined crank angle +CA5 in an initial stage of the expansion stroke. The crank angle CA4 is 70° after the TDC. A start timing of the fuel injection period PF4 as a latter part is 10° before the TDC in the compression stroke, for example.

When the engine is operated in the mode II and in the mode III in this way, an end timing (timing T22) of the fuel injection period PF2 in the mode II, which is illustrated in FIG. 8, may be set in a middle stage of a compression stroke, and fuel may be continuously injected during a period from an intake stroke to a compression stroke.

Also in the structure of a combustion chamber according to the third embodiment as described above, when the piston 5 is lowered toward the −Z side in an expansion stroke, a reverse squish flow which draws an air-fuel mixture toward the intake port side is generated. Thus, it is possible to cause combustion using oxygen within the entirety of the combustion chamber 6, and to suppress lowering of emission performance.

In the third embodiment, the cavity 5C has a cup shape recessed downwardly (in a direction away from the combustion chamber ceiling surface 6U), and an obstacle is not present inside the cavity 5C, namely, an obstacle is not present on the bottom surface portion 511. Therefore, it is possible to smoothly guide the air-fuel mixture within the cavity 5C to the ignition portion 17A of the ignition plug 17, and flame propagation after ignition is smoothly performed.

Furthermore, the cavity 5C includes the lateral upright portions 512 which interpose the ignition portion 17A of the ignition plug 17 therebetween, when the piston 5 is in the compression top dead center (TDC). Therefore, when in-cylinder flow within the combustion chamber 6 is gathered within the cavity 5C, as the piston 5 is lifted, the air-fuel mixture is smoothly guided to the ignition portion 17A of the ignition plug 17 and its periphery by the lateral upright portions 512. Thus, high ignitability is achieved.

In particular, the lateral upright portion 512 of the cavity 5C is formed of a curved surface, and the curvature radius R512 of the lateral upright portion 512 is set smaller than the curvature radius R511 of the bottom surface portion 511. Thus, it is possible to more smoothly guide an air-fuel mixture within the cavity 5C to the ignition portion 17A of the ignition plug 17, and to smoothly spread flame generated by ignition in the Y-direction (engine output shaft direction) within the combustion chamber 6.

In addition, in the third embodiment, the engine body 1 is configured in such a way that fuel injection is performed from an injector 18 toward the cavity 5C in a middle stage of an intake stroke in which in-cylinder flow is relatively weak. Therefore, it is possible to concentrate atomization within the cavity 5C, and to suppress fuel adhesion onto an inner wall surface of a cylinder 2. Accordingly, it is possible to allow for an air-fuel mixture to be present around the ignition portion 17A of the ignition plug 17 and its periphery in a satisfactory manner in ignition, which makes it possible to secure high ignitability of air-fuel mixture.

[Modifications]

In the foregoing, embodiments as one aspect of the present invention are described. The present invention, however, is not limited to the above. For example, the following modifications can be employed.

(1) In the above first embodiment, an example, in which the small cavity 51 and the large cavity 52 are disposed to come into contact with each other via the ridge line 54, is described. The present invention, however, is not limited to the above. For example, a small cavity as a first cavity and a large cavity as a second cavity may be disposed to be substantially adjacent to each other in terms of flow (swirl flow FS) of air-fuel mixture, and flame propagation. The small cavity and the large cavity may be away from each other in terms of structure.

Furthermore, in the above first embodiment, the cavity 5C is formed by combination of the small cavity 51 and the large cavity 52. Alternatively, an integral annular cavity may be formed, or an annular cavity may be formed by combination of three or more cavities.

(2) In the above first to third embodiments, each of the intake-side flat portion 55 and the intake-side top surface 43 is formed of a flat surface. The present invention, however, is not limited to the above. For example, the intake-side flat portion 55 and the intake-side top surface 43 may be formed of curved surfaces opposed to each other.

(3) In the above first embodiment, regarding the small cavity 51 and the large cavity 52 provided in the crown surface 50 of the piston 5, a configuration, in which a projection area of the large cavity 52 is larger than a projection area of the small cavity 51, and the depth h2 of the large cavity 52 is deeper than the depth h1 of the small cavity 51, is described as an example. The present invention, however, is not limited to the above. For example, it is possible to make a volume of the large cavity larger than a volume of the small cavity by a difference in projection area while setting the depths of the large cavity and the small cavity equal to each other.

(4) In the above first to third embodiments, an example, in which the two intake-side opening portions 41 are provided in the combustion chamber ceiling surface 6U, is described. Alternatively, it is possible to employ a configuration, in which a swirl control valve is provided in an intake port 9 communicating with one of the intake-side opening portions 41, and which can actively generate the swirl flow FS within the combustion chamber 6.

In a case where the swirl flow FS is actively used, closing one of the intake-side opening portions 41 by the swirl control valve makes it easy to generate a swirl flow being a vortex flow around a cylinder shaft (cylinder axis). In view of the above, it is desirable to operate the swirl control valve in the above-described SI combustion or SICI combustion (modes II and III), for example.

(5) In the above first to third embodiments, the intake-side opening portion 41 and the exhaust-side opening portion 42 are provided in the combustion chamber ceiling surface 6U. The present invention, however, is not limited to the above. For example, the intake-side opening portion 41 and the exhaust-side opening portion 42 may be provided in a lateral peripheral surface of the cylinder 2 in an upper portion of the combustion chamber 6.

(6) In the above first to third embodiments, a ceiling surface (combustion chamber ceiling surface 6U) of the combustion chamber 6 is formed into a relatively flat pent-roof shape. The present invention, however, is not limited to the above. For example, the combustion chamber ceiling surface 6U may be formed into a pent-roof shape having a relatively high ratio. This is advantageous in generating a stronger tumble flow.

(7) In the above first embodiment, a reverse squish flow generation portion is formed by a difference in the volume of the combustion chamber between the portion A and the portion B as illustrated in FIG. 9, and combination of the intake-side flat portion 55 and the intake-side top surface 43 as illustrated in FIGS. 10A and 10B. The present invention, however, is not limited to the above. For example, a reverse squish flow generation portion may be formed only by a difference in the volume of the combustion chamber between the portion A and the portion B. Conversely, a reverse squish flow generation portion may be formed only by combination of the intake-side flat portion 55 and the intake-side top surface 43.

(8) In the above third embodiment, a cross section of the cavity 5C of the piston 5 is formed by combination of the bottom surface portion 511 and the two lateral upright portions 512 (cross section taken along the line XXXI-XXXI in FIG. 30). The present invention, however, is not limited to the above. For example, it is possible to form a cross-sectional configuration in which a curved surface or a flat surface is interposed between the bottom surface portion 511 and the lateral upright portion 512.

The following is an overview of the present invention described above.

A structure of a combustion chamber for a spark ignited engine according to one aspect of the present invention includes a crown surface of a piston, a combustion chamber ceiling surface formed on a cylinder head, an injector and an ignition plug provided on the combustion chamber ceiling surface, and an intake opening and an exhaust opening opened in a ceiling surface of the combustion chamber.

In the structure of a combustion chamber for the engine according to the present aspect, a side where the intake opening is opened is defined as an intake port side of the combustion chamber, and a side where the exhaust opening is opened is defined as an exhaust port side of the combustion chamber, with respect to a position, as a reference, where an ignition portion of the ignition plug is disposed in a plan view from one side in a cylinder axis direction, the injector is configured to inject fuel at least toward the exhaust port side. And, in the structure of a combustion chamber for the engine according to the present aspect, a reverse squish flow generation portion, which draws an air-fuel mixture toward the intake port side as the piston moves (is lowered) in an expansion stroke, is provided in the combustion chamber.

In the structure of a combustion chamber for the engine according to the above aspect, since the injector is configured to inject fuel toward the exhaust port side, it is possible to atomize the fuel in a short time, even when the engine is in a high load operating range in which the combustion chamber reaches a high temperature. Therefore, in the above aspect, it is possible to suppress occurrence of pre-ignition in a high load operating range.

Furthermore, in the structure of a combustion chamber for the engine according to the above aspect, since the reverse squish flow generation portion is formed within the combustion chamber, it is possible to draw an air-fuel mixture atomized on the exhaust port side toward a side of the ignition plug, as the piston is lowered in an expansion stroke. Therefore, in the above aspect, it is possible to cause combustion using oxygen within the entirety of the combustion chamber, and to suppress lowering of emission performance.

Accordingly, in the structure of a combustion chamber for the engine according to the above aspect, it is possible to suppress occurrence of pre-ignition even when the engine is operated in a high load operating range, and to suppress lowering of emission performance by homogeneous combustion within the entirety of the combustion chamber.

In the structure of a combustion chamber for the engine according to another aspect of the present invention, in the above aspect, the combustion chamber is configured in such a way that a volume of a portion on the intake port side is smaller than a volume of a portion on the exhaust port side, and the reverse squish flow generation portion is formed by a difference in the volume of the combustion chamber between the intake port side and the exhaust port side.

In the structure of a combustion chamber for the engine according to the above aspect, since the reverse squish flow generation portion is formed by a difference in the volume of the combustion chamber between the intake port side and the exhaust port side, it is possible to generate an air flow (reverse squish flow) directing from a middle portion (and from the exhaust port side) of the combustion chamber toward the intake port side, as the piston is lowered in an expansion stroke. Therefore, it is possible to cause combustion using oxygen within the entirety of the combustion chamber, and to suppress lowering of emission performance.

The structure of a combustion chamber for the engine according to another aspect of the present invention is configured such that, in the above aspect, a region, in which a partial region of the combustion chamber ceiling surface and a partial region of the crown surface of the piston are opposed to and parallel to each other, and are proximate to each other as compared with a radially middle region of the combustion chamber, is formed on the intake port side of the combustion chamber. And, in the present aspect, the reverse squish flow generation portion is formed by combination of the partial region of the combustion chamber ceiling surface and the partial region of the crown surface of the piston being proximate to each other.

In the structure of a combustion chamber for the engine according to the above aspect, since the reverse squish flow generation portion is formed by the partial region of the combustion chamber ceiling surface and the partial region of the crown surface of the piston being parallel to each other and in proximity to each other, it is possible to generate a reverse squish flow within the combustion chamber using a negative pressure in a portion between the partial regions, which is generated after the piston passes the compression top dead center.

Accordingly, in the above aspect, it is possible to cause combustion using oxygen within the entirety of the combustion chamber, and to suppress lowering of emission performance.

The structure of a combustion chamber for the engine according to another aspect of the present invention is configured such that, in the above aspect, the partial region of the combustion chamber ceiling surface and the partial region of the crown surface of the piston are respectively flat surfaces.

In the structure of a combustion chamber for the engine according to the above aspect, since the partial region of the combustion chamber ceiling surface and the partial region of the crown surface of the piston are respectively formed of flat surfaces, production is easy, as compared with a case where these regions are formed of curved surfaces. Thus, it is possible to form the reverse squish flow generation portion, while suppressing an increase in production cost.

The structure of a combustion chamber for the engine according to another aspect of the present invention is configured such that, in the above aspect, a region, in which the combustion chamber ceiling surface and the crown surface of the piston are opposed to and parallel to each other, and are proximate to each other as compared with a radially middle region of the combustion chamber, is formed on the exhaust port side of the combustion chamber, and an area of the region, in which the combustion chamber ceiling surface and the crown surface of the piston are opposed to each other on the exhaust port side, is smaller than an area of the reverse squish flow generation portion, in a plan view from the one side in the cylinder axis direction.

In the structure of a combustion chamber for the engine according to the above aspect, a region, in which the combustion chamber ceiling surface and the crown surface of the piston are opposed to each other, is provided also on the exhaust port side. Thus, it is possible to suppress fuel adhesion on the exhaust port side of a cylinder liner when fuel is injected. Hence, in the above aspect, it is possible to suppress generation of deposits.

Furthermore, in the structure of a combustion chamber for the engine according to the above aspect, an area in a plan view of a region, in which the combustion chamber ceiling surface and the crown surface of the piston are opposed to each other, is made smaller than the reverse squish flow generation portion (a region to which the combustion chamber ceiling surface and the crown surface of the piston are opposed on the intake port side in a plan view). Thus, it is less likely that generation of a reverse squish flow is obstructed, when the piston is lowered.

The structure of a combustion chamber for the engine according to another aspect of the present invention is configured such that, in the above aspect, a cavity, which is recessed in the cylinder axis direction, is provided on the crown surface of the piston, and the cavity is formed in such a way that a depth of a bottom surface of the cavity gradually decreases from the exhaust port side toward a side of the ignition portion of the ignition plug.

In the structure of a combustion chamber for the engine according to the above aspect, since the cavity is formed in such a way that a depth of a bottom surface of the cavity gradually decreases toward a side of the ignition portion of the ignition plug, a swirl component within the cavity is raised toward the ignition portion of the ignition plug, when the piston is lifted. Thus, an air-fuel mixture of fresh air and fuel is guided toward the vicinity of the ignition portion of the ignition plug, which makes it possible to expel residual gas in the vicinity of the ignition portion.

Furthermore, in the structure of a combustion chamber for the engine according to the above aspect, even in a case where a reverse squish flow generated when the piston is lowered is used, the air-fuel mixture is smoothly guided toward the ignition portion of the ignition plug.

The structure of a combustion chamber for the engine according to another aspect of the present invention is configured such that, in the above aspect, the cavity is formed into an annular shape in a state that a part of the cavity overlaps the ignition portion of the ignition plug, in a plan view from the one side in the cylinder axis direction.

In the structure of a combustion chamber for the engine according to the above aspect, since the cavity is formed into an annular shape, the air-fuel mixture flows from the exhaust port side of a relatively high temperature toward the intake port side of a relatively low temperature, and is guided to the vicinity of the ignition portion of the ignition plug, as the piston approaches the compression top dead center. And, since the ignition portion of the ignition plug is disposed to overlap a part of the cavity in a plan view, it is possible to secure enhanced ignitability.

The structure of a combustion chamber for the engine according to another aspect of the present invention is configured such that, in the above aspect, the combustion chamber ceiling surface is formed into a pent-roof shape.

In the structure of a combustion chamber for the engine according to the above aspect, since the ceiling surface of the combustion chamber (cylinder) is formed into a pent-roof shape, it is possible to generate a tumble flow within the combustion chamber, and to realize homogeneous combustion within the entirety of the combustion chamber.

The structure of a combustion chamber for the engine according to another aspect of the present invention is configured such that, in the above aspect, an outer rim of the cavity includes a plug pointing portion, which is curved toward the ignition portion of the ignition plug when viewed in the cylinder axis direction.

In the structure of a combustion chamber for the engine according to the above aspect, the air-fuel mixture guided along the cavity is guided to the vicinity of the ignition portion of the ignition plug in a satisfactory manner. This enables to secure enhanced ignitability.

The structure of a combustion chamber for the engine according to another aspect of the present invention is configured such that, in the above aspect, as the partial region of the crown surface of the piston, an intake-side flat portion which is located on the intake port side with respect to a region corresponding to the ignition plug, and an intake-side slope portion which is located between the intake-side flat portion and the region corresponding to the ignition plug, and is inclined obliquely upwardly from the intake port side toward the exhaust port side, are formed. The ignition portion of the ignition plug includes a ground electrode of an L-shape in a side view. A distal end of the ground electrode faces radially inwardly of a cylinder in a plan view from the one side in the cylinder axis direction.

In the structure of a combustion chamber for the engine according to the above aspect, when the piston moves (is lifted) in a compression stroke, the air-fuel mixture (intake air) is compressed between the combustion chamber ceiling surface and the intake-side flat portion of the piston, and a squish flow directing toward the combustion chamber ceiling surface along the intake-side slope portion is generated. At this occasion, since the ignition plug is disposed in such a way that the distal end of the ground electrode faces radially inwardly of the cylinder, it becomes easy to expel residual gas by the squish flow, and the scavenging effect around the ignition portion is enhanced.

The structure of a combustion chamber for the engine according to another aspect of the present invention is configured such that, in the above aspect, a cavity, which has a cup-shape and is recessed in the cylinder axis direction at a position on the exhaust port side with respect to the reverse squish flow generation portion in a plan view from the one side in the cylinder axis direction, is provided on the crown surface of the piston.

In the structure of a combustion chamber for the engine according to the above aspect, as the piston is lifted in a compression stroke, the air-fuel mixture is gathered within the cavity. As the piston is lowered in an expansion stroke, the air-fuel mixture atomized on the exhaust port side is guided to the ignition portion of the ignition plug and its periphery. Thus, it is possible to secure enhanced ignitability of air-fuel mixture. In particular, since an obstacle is not present inside the cavity, it is possible to smoothly guide the air-fuel mixture to the ignition plug, and it becomes possible to smoothly perform flame propagation after ignition.

In the structure of a combustion chamber for the engine according to the above aspect, the cavity is formed of a curved surface curved in the cylinder axis direction, and both side portions of a rim portion of the cavity in an engine output axis direction are formed of a curved surface having a curvature radius smaller than a curvature radius of an inner region of the rim portion in a plan view from the one side in the cylinder axis direction.

In the structure of a combustion chamber for the engine according to the above aspect, since both side portions of the rim portion of the cavity in the engine output axis direction are raised, as compared with an inner region of the cavity, the air-fuel mixture within the cavity is more smoothly guided to the ignition plug. Furthermore, flame generated by ignition smoothly spreads in the engine output axis direction within the combustion chamber.

The structure of a combustion chamber for the engine according to another aspect of the present invention is configured such that, in the above aspect, the both side portions of the rim portion of the cavity in the engine output axis direction are located at such a position as to interpose the ignition portion therebetween, when the piston is in a compression top dead center position.

In the structure of a combustion chamber for the engine according to the above aspect, when in-cylinder flow within the combustion chamber is gathered within the cavity, as the piston is lifted in a compression stroke, the air-fuel mixture is guided to the ignition plug and its periphery in a satisfactory manner Thus, it becomes possible to secure more enhanced ignitability.

The structure of a combustion chamber for the engine according to another aspect of the present invention is configured such that, in the above aspect, a part of the cavity overlaps the ignition portion of the ignition plug in a plan view from the one side in the cylinder axis direction.

In the structure of a combustion chamber for the engine according to the above aspect, as the piston approaches the compression top dead center, the air-fuel mixture flows from the exhaust port side of a relatively high temperature toward the intake port side of a relatively low temperature, and is guided to the vicinity of the ignition portion of the ignition plug. And, since the ignition portion of the ignition plug is disposed to overlap a part of the cavity in a plan view, it is possible to secure enhanced ignitability.

The structure of a combustion chamber for the engine according to another aspect of the present invention is configured such that, in the above aspect, the combustion chamber ceiling surface is formed into a pent-roof shape.

In the structure of a combustion chamber for the engine according to the above aspect, since the ceiling surface of the combustion chamber (cylinder) is formed into a pent-roof shape, it is possible to generate a tumble flow within the combustion chamber, and to realize homogeneous combustion within the entirety of the combustion chamber.

The structure of a combustion chamber for the engine according to another aspect of the present invention is configured such that, in the above aspect, as the partial region of the crown surface of the piston, an intake-side flat portion which is located on the intake port side with respect to a region corresponding to the ignition plug, and an intake-side slope portion which is located between the intake-side flat portion and the region corresponding to the ignition plug, and is inclined obliquely upwardly from the intake port side toward the exhaust port side, are formed. The ignition portion of the ignition plug includes a ground electrode of an L-shape in a side view. A distal end of the ground electrode faces radially outwardly of a cylinder in a plan view from the one side in the cylinder axis direction.

In the structure of a combustion chamber for the engine according to the above aspect, when the piston moves (is lifted) in a compression stroke, the air-fuel mixture (intake air) is compressed between the combustion chamber ceiling surface and the intake-side flat portion of the piston, and a squish flow directing toward the combustion chamber ceiling surface along the intake-side slope portion is generated. At this occasion, residual gas is expelled by the squish flow to thereby enhance the scavenging effect around the ignition portion.

The invention claimed is:

1. A spark ignited engine, comprising:
a crown surface of a piston;

a combustion chamber ceiling surface formed on a cylinder head;

an injector and an ignition plug provided on the combustion chamber ceiling surface; and an intake opening and an exhaust opening opened in the combustion chamber ceiling surface, wherein the ignition plug is ignited when the piston is in an expansion stroke, a side where the intake opening is opened is defined as an intake port side of the combustion chamber, and a side where the exhaust opening is opened is defined as an exhaust port side of the combustion chamber, with respect to a position, as a reference, where an ignition portion of the ignition plug is disposed in a plan view from one side in a cylinder axis direction, the piston has an intake-side flat portion at an end on the intake port side of the crown surface, and an exhaust-side flat portion at an end on the exhaust port side of the crown surface, the exhaust-side flat portion being separate and spaced apart from the intake-side flat portion, the injector is configured to inject fuel at least toward the exhaust port side, and a reverse squish flow generation portion, which draws an air-fuel mixture toward the intake port side as the piston moves in an expansion stroke, includes the intake-side flat portion and the combustion chamber ceiling surface, an area of the intake-side flat portion is larger than an area of the exhaust-side flat portion, and a maximum width of the exhaust-side flat portion is narrower than a maximum width of the intake-side flat portion in an engine output axis direction.

2. The spark ignited engine according to claim 1, wherein a cavity, which is recessed in the cylinder axis direction, is provided on the crown surface of the piston, and the cavity is formed in such a way that a depth of a bottom surface of the cavity gradually decreases from the exhaust port side toward a side of the ignition portion of the ignition plug.

3. The spark ignited engine according to claim 2, wherein the cavity is formed into an annular shape in a state that a part of the cavity overlaps the ignition portion of the ignition plug, in a plan view from the one side in the cylinder axis direction.

4. The spark ignited engine according to claim 3, wherein an outer rim of the cavity includes a plug pointing portion, which is curved toward the ignition portion of the ignition plug when viewed in the cylinder axis direction.

5. The spark ignited engine according to claim 1, wherein the combustion chamber ceiling surface is formed into a pent-roof shape.

6. The spark ignited engine according to claim 1, comprising an intake-side flat portion and an intake-side slope portion, wherein the intake-side slope portion is located between the intake-side flat portion and the region corresponding to the ignition plug, and inclined obliquely upwardly from the intake port side toward the exhaust port side, the ignition portion of the ignition plug includes a ground electrode of an L-shape in a side view, and a distal end of the ground electrode faces radially inwardly of a cylinder in a plan view from the one side in the cylinder axis direction.

7. The spark ignited engine according to claim 1, wherein a cavity, which has a cup-shape and is recessed in the cylinder axis direction at a position on the exhaust port side with respect to the reverse squish flow generation portion in a plan view from the one side in the cylinder axis direction, is provided on the crown surface of the piston.

8. The spark ignited engine according to claim 7, wherein the cavity is formed of a curved surface curved in the cylinder axis direction, and opposing side portions of a rim portion of the cavity in an engine output axis direction are each formed of a curved surface having a curvature radius smaller than a curvature radius of an inner region of the rim portion in a plan view from the one side in the cylinder axis direction.

9. The spark ignited engine according to claim 8, wherein the opposing side portions of the rim portion of the cavity in the engine output axis direction are located such that the ignition portion is interposed therebetween, when the piston is in a compression top dead center position.

10. The spark ignited engine according to claim 7, wherein a part of the cavity overlaps the ignition portion of the ignition plug in a plan view from the one side in the cylinder axis direction.

11. The spark ignited engine according to claim 7, wherein the combustion chamber ceiling surface is formed into a pent-roof shape.

12. The spark ignited engine according to claim 7, wherein comprising an intake-side flat portion and an intake-side slope portion, wherein the intake-side slope portion is located between the intake-side flat portion and the region corresponding to the ignition plug, and inclined obliquely upwardly from the intake port side toward the exhaust port side, the ignition portion of the ignition plug includes a ground electrode of an L-shape in a side view, and a distal end of the ground electrode faces radially outwardly of a cylinder in a plan view from the one side in the cylinder axis direction.

13. The spark ignited engine according to claim 2, wherein the intake-side flat portion and the exhaust-side flat portion are arranged away from each other on opposing sides of the cavity with the cavity interposed therebetween.

14. The spark ignited engine according to claim 1, wherein in a plan view from the one side in the cylinder axis direction, the cavity has a substantially C-shape, and the ignition portion of the ignition plug is disposed at a position where the ignition portion overlaps the C-shaped opened portion of the cavity.

15. The spark ignited engine according to claim 1, wherein an intake-side top surface portion is provided in a region on an intake side of the combustion chamber ceiling surface, the intake-side top surface portion being opposed to the intake-side flat portion with a gap therebetween when the piston is in the compression top dead center position, and an exhaust-side top surface portion is provided in a region on an exhaust side of the combustion chamber ceiling surface, the exhaust-side top surface portion being opposed to the exhaust-side flat portion with a gap therebetween when the piston is in the compression top dead center position, and the reverse squish flow generation portion is formed such that an area where the intake-side flat portion and the intake-side top surface are opposed to each other is larger than an area where the exhaust-side flat portion and the exhaust-side top surface are opposed to each other to draw the air-fuel mixture toward the intake port side as the piston is lowered in the expansion stroke.

* * * * *